(12) United States Patent
Farrell et al.

(10) Patent No.: US 9,110,878 B2
(45) Date of Patent: *Aug. 18, 2015

(54) USE OF A WARNING TRACK INTERRUPTION FACILITY BY A PROGRAM

(75) Inventors: Mark S. Farrell, Pleasant Valley, NY (US); Charles W. Gainey, Jr., Poughkeepsie, NY (US); Jeffrey P. Kubala, Poughquag, NY (US); James H. Mulder, Poughkeepsie, NY (US); Bernard Pierce, Poughkeepsie, NY (US); Robert R. Rogers, Poughkeepsie, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

This patent is subject to a terminal disclaimer.

(21) Appl. No.: 13/352,514

(22) Filed: Jan. 18, 2012

(65) Prior Publication Data

US 2013/0185736 A1    Jul. 18, 2013

(51) Int. Cl.
*G06F 3/00* (2006.01)
*G06F 9/455* (2006.01)
*G06F 9/54* (2006.01)
*G06F 13/24* (2006.01)

(52) U.S. Cl.
CPC . *G06F 13/24* (2013.01); *G06F 9/54* (2013.01)
USPC .............................. 719/310; 718/1

(58) Field of Classification Search
CPC ........... G06F 13/24; G06F 9/54; G06F 9/542; G06F 9/45533
See application file for complete search history.

(56) References Cited

U.S. PATENT DOCUMENTS

| 4,001,783 | A |   | 1/1977 | Monahan et al. |
| 4,271,468 | A | * | 6/1981 | Christensen et al. ........... 710/39 |
| 5,414,812 | A |   | 5/1995 | Filip et al. |
| 5,485,626 | A | * | 1/1996 | Lawlor et al. ................. 719/315 |
| 5,548,535 | A |   | 8/1996 | Zvonar |
| 5,551,013 | A |   | 8/1996 | Beausoleil et al. |

(Continued)

FOREIGN PATENT DOCUMENTS

| JP | S6413634 A | 1/1989 |
| JP | 2010218151 A | 9/2010 |

OTHER PUBLICATIONS

Zhang, J. et al., "Performance Analysis Towards a KVM-Based Embedded Real-Time Virtualization Architecture," Proceedings of the 5$^{th}$ International Conference on Computer Sciences & Convergence Information Technology, Nov. 2010, IEEE; pp. 421-426.

(Continued)

*Primary Examiner* — H S Sough
*Assistant Examiner* — Kimberly Jordan
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

A program (e.g., an operating system) is provided a warning that it has a grace period in which to perform a function, such as cleanup (e.g., complete, stop and/or move a dispatchable unit). The program is being warned, in one example, that it is losing access to its shared resources. For instance, in a virtual environment, a guest program is warned that it is about to lose its central processing unit resources, and therefore, it is to perform a function, such as cleanup.

20 Claims, 18 Drawing Sheets

(56) References Cited

U.S. PATENT DOCUMENTS

| | | | |
|---|---|---|---|
| 5,574,873 | A | 11/1996 | Davidian |
| 5,594,893 | A | 1/1997 | Byers et al. |
| 5,652,889 | A * | 7/1997 | Sites .............................. 717/144 |
| 5,790,825 | A | 8/1998 | Traut |
| 6,009,261 | A | 12/1999 | Scalzi et al. |
| 6,308,255 | B1 | 10/2001 | Gorishek, IV et al. |
| 6,415,190 | B1 | 7/2002 | Colas et al. |
| 6,463,582 | B1 | 10/2002 | Lethin et al. |
| 6,470,376 | B1 * | 10/2002 | Tanaka et al. ................. 718/108 |
| 6,581,119 | B1 * | 6/2003 | Maeda et al. ................. 710/260 |
| 7,299,464 | B2 | 11/2007 | Shultz et al. |
| 7,475,002 | B1 | 1/2009 | Mann |
| 7,536,690 | B2 | 5/2009 | Alverson et al. |
| 7,689,998 | B1 | 3/2010 | Chrysanthakopoulos |
| 7,707,578 | B1 | 4/2010 | Zedlewski et al. |
| 7,725,531 | B1 | 5/2010 | Sood et al. |
| 8,261,284 | B2 | 9/2012 | Loeser |
| 8,307,363 | B2 | 11/2012 | Nakai |
| 2002/0016809 | A1 | 2/2002 | Foulger et al. |
| 2004/0064818 | A1 | 4/2004 | Alverson et al. |
| 2008/0320489 | A1 | 12/2008 | Grouzdev |
| 2010/0031254 | A1 | 2/2010 | Chin et al. |
| 2010/0088771 | A1 | 4/2010 | Heller et al. |
| 2010/0332637 | A1 | 12/2010 | Doi et al. |
| 2011/0154332 | A1 | 6/2011 | Shirae et al. |
| 2012/0110581 | A1 | 5/2012 | Watson et al. |
| 2012/0117564 | A1 | 5/2012 | Friebel et al. |
| 2013/0185732 | A1 | 7/2013 | Farrell et al. |
| 2013/0185735 | A1 | 7/2013 | Farrell et al. |
| 2013/0185737 | A1 | 7/2013 | Farrell et al. |
| 2013/0185738 | A1 | 7/2013 | Farrell et al. |
| 2013/0185739 | A1 | 7/2013 | Farrell et al. |

OTHER PUBLICATIONS

Wen, C. et al., "PCFS: A Power Credit Based Fair Scheduler Under DVFS for Multi-Core Virtualization Platform," Proceedings of 2010 IEEE/ACM International Conference on Green Computing and Communications; International Conference on Cyber Physical and Social Computing (CPSCom); pp. 163-170; Dec. 2010.

Anonymous, "System and Method for a Dynamic Virtual Network Partition Infrastructure," IBM Technical Disclosure Bulletin—IPCOM000195263D, Apr. 2010, pp. 1-7.

Coleman, A. et al., "Deferring Assignment of SNA LU 6.2 Logical Unit of Work Identifiers," IBM Technical Disclosure Bulletin—IPCOM000372911D, Dec. 1989, pp. 189-190.

"z/Architecture Principles of Operation," IBM® Publication No. SA22-7832-08, Ninth Edition, Aug. 2010.

"z/Vm: Running Guest Operating Systems," IBM® Publication No. SC24-5997-02, Oct. 2001, pp. 1-179.

"z/Vm: General Information Manual," IBM Publication No. GC24-5991-04, Oct. 2001, pp. 1-119.

"System/370 Extended Architecture/Interpretive Execution," IBM Publication No. SA22-7095-01, Sep. 1985, pp. 1-32.

International Search Report and Written Opinion for PCT/IB12/56370 dated Mar. 26, 2013, pp. 1-7.

Office Action for U.S. Appl. No. 13/352,509 dated Sep. 11, 2013, pp. 1-18.

International Search Report and Written Opinion for PCT/IB12/56371 dated Mar. 26, 2013, pp. 1-7.

International Search Report and Written Opinion for PCT/IB12/56372 dated Mar. 26, 2013, pp. 1-7.

Final Office Action for U.S. Appl. No. 13/352,509 dated Jan. 24, 2014, pp. 1-22.

Office Action for U.S. Appl. No. 13/722,937 dated Jan. 31, 2014, pp. 1-24.

Final Office Action for U.S. Appl. No. 13/722,937 date May 30, 2014, pp. 1-7.

"Proceedings of the Linux Symposium, vol. 1," Jun. 30, 2007, 314 pages.

Office Action for U.S. Appl. No. 13/718,570 dated Jul. 16, 2014, 22 pages.

Office Action for U.S. Appl. No. 13/352,518 dated Jul. 22, 2014, 24 pages.

Motwani, Rajeev et al., "Combining Register Allocation and Instruction Scheduling," Technical Report, Stanford University, 1995 (no further date information available), pp. 1-16.

Office Action for U.S. Appl. No. 13/718,384 dated Aug. 15, 2014, 21 pages.

Office Action for U.S. Appl. No. 14/322,157 dated Oct. 22, 2014, 11 pages.

European Search Report for PCT/IB2012056370 dated Nov. 24, 2014, pp. 1-6.

Li, Peng, et al., "Utility Accrual Real-time Scheduling with Probabilistically-Assured Timeliness Performance," 2004 (no further date information available), pp. 1-4.

* cited by examiner

USE OF A WARNING TRACK INTERRUPTION FACILITY BY A PROGRAM

BACKGROUND

An aspect of this invention relates, in general, to processing within a computing environment, and in particular, to facilitating processing associated with shared resources.

One type of environment in which resources are shared is a virtual environment, which includes a host central processing unit (CPU) and one or more guest central processing units. A guest CPU (also known as a virtual CPU) is provisioned by a host program (e.g., host operating system) executing on a host CPU. The host program performs actions to allocate resources from an underlying host configuration and to assign those resources to the guest CPU.

In one particular embodiment, a guest CPU exists when a host CPU enters the interpretive-execution mode. At this point, the guest operating system (also referred to herein as the guest program) begins execution on the virtualized CPU, while the host program suspends execution on the host CPU. The host program resumes execution on the CPU when the interpretive-execution mode ends. Linkage techniques exist between the host and the guest by which host and guest state is saved and restored. Typically, when a host program starts a guest program, the host program suspends until the guest program returns. Both the guest CPU and host CPU are different modes of the one host CPU.

The host configuration usually includes all of the resources of the computer system. These resources include, but are not limited to, central processing units (CPUs), main memory, and input/output (I/O) devices. In such a system, multiple guest CPUs may be supported from a single host CPU. This is accomplished by assigning each guest CPU a period of time to use the host CPU, called a timeslice, and then moving the host CPU to another guest CPU for a timeslice, and so forth. The number of guest CPUs supportable by a host CPU varies according to the capabilities of the host CPU and the desired capability to be assigned to each guest CPU.

A guest configuration is typically formed from two or more guest CPUs, and is referred to as a guest multiprocessing (MP) configuration. Each guest CPU can be provisioned by a share of a separate host CPU or even by sharing a single host CPU. One attribute of such sharing is that a guest CPU can operate for a period of time, referred to as a timeslice, and then is inactive for some arbitrary period of time. The inactive period varies based on priority policies established by the system, the overall number of guest CPUs that are to share host CPUs, and the particular sharing technique being used.

In such a guest multiprocessing system, a program, sometimes called a dispatchable unit (DU), can be dispatched by the guest operating system on a guest CPU, and then during execution of that dispatchable unit, the host timeslice of that dispatchable unit expires. This could leave the dispatchable unit in such a condition that it cannot be continued on any other guest CPU of the guest multiprocessing configuration, regardless of the availability of any other guest CPUs. Instead, it must wait for the one and only guest CPU to receive its next timeslice in order to continue. Based on the sharing technique and the relative priority of the guest configuration, the next timeslice can be delayed for a substantial period of time. Even if the guest configuration has other guest CPUs that are capable of running the dispatchable unit, continuation of the dispatchable unit is not possible due to the state of the dispatchable unit's guest CPU that was saved when the prior timeslice expired. Until that precise state can be used to continue the guest CPU, the dispatchable unit is inactive.

BRIEF SUMMARY

Shortcomings of the prior art are overcome and advantages are provided through the provision of a computer program product for facilitating processing in a computing environment. The computer program product includes a computer readable storage medium readable by a processing circuit and storing instructions for execution by the processing circuit for performing a method. The method includes, for instance, obtaining by a program an indication of a warning track facility installed within the computing environment, the warning track facility to provide to the program a warning track grace period to perform a function; receiving by the program a warning track notification indicating the warning track grace period has begun; and based on the warning track notification, at least initiating by the program the function within the warning track grace period.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of the invention are apparent from the following detailed description taken in conjunction with the accompanying drawings in which:

DETAILED DESCRIPTION

In accordance with an aspect of the present invention, a capability is provided for warning a program (e.g., an operating system) that it has a grace period in which to perform a function. For instance, a program is given a grace period to perform cleanup (e.g., complete, stop and/or move a dispatchable unit).

In accordance with a further aspect of the present invention, a program and/or a processor is warned that it is about to lose access to resources (e.g., shared resources). For instance, a warning is provided to a processor sharing resources with other processors that the processor is about to lose access to the resources. As a further example, a program, such as an operating system, executing on a shared processor (i.e., the program shares the processor with other programs) is warned that it is about to lose its processor resources.

In one particular embodiment, a capability is provided in which a guest program executing on a guest CPU provisioned by a host CPU is provided a warning of expiration of a timeslice given to the guest CPU from the host CPU or of pre-emption by the host of the guest's timeslice. The warning provides a grace period that the guest CPU can use to perform a particular function, such as complete execution of a dispatchable unit, stop the dispatchable unit at a point in which the dispatchable unit is re-dispatchable, and/or move the dispatchable unit to another guest CPU.

As used herein, a grace period includes as examples an amount of time, a number of instructions, a number of cycles, etc. It is of a predetermined duration in which one or more functions can be performed.

Figure 1:
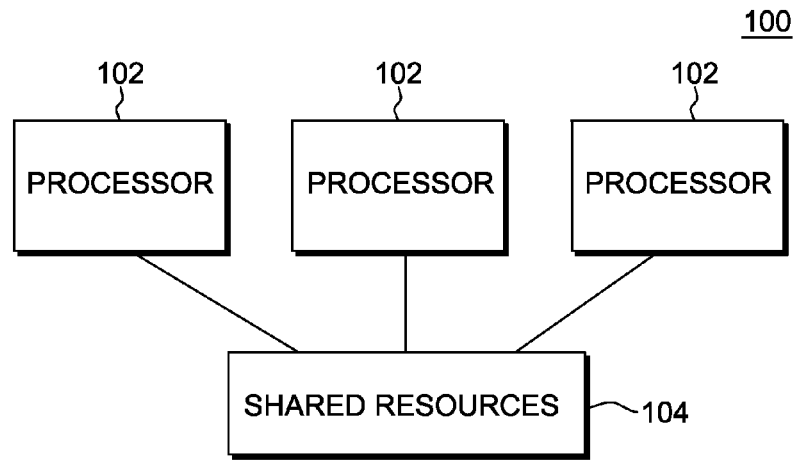
FIG. 1 depicts one embodiment of a computing environment to incorporate and use one or more aspects of the present invention.

One embodiment of a computing environment to incorporate and use one or more aspects of the present invention is described with reference to FIG. 1. In this particular embodiment, a computing environment 100 includes a plurality of processors 102 sharing resources 104. Each processor (and/or a program, such as an operating system, executing on the processor) is given a certain amount of time, referred to as a timeslice, to share the resources. The resources include central processing unit resources, memory, input/output devices or interfaces, and/or other resources, as examples. The processor (or a program executing thereon) having access to the resources is warned that its access is about to end, and therefore, the processor (or program) is to perform a particular action, such as clean-up, completing a unit of work, stopping a unit of work, moving a unit of work, etc.

Figure 2:
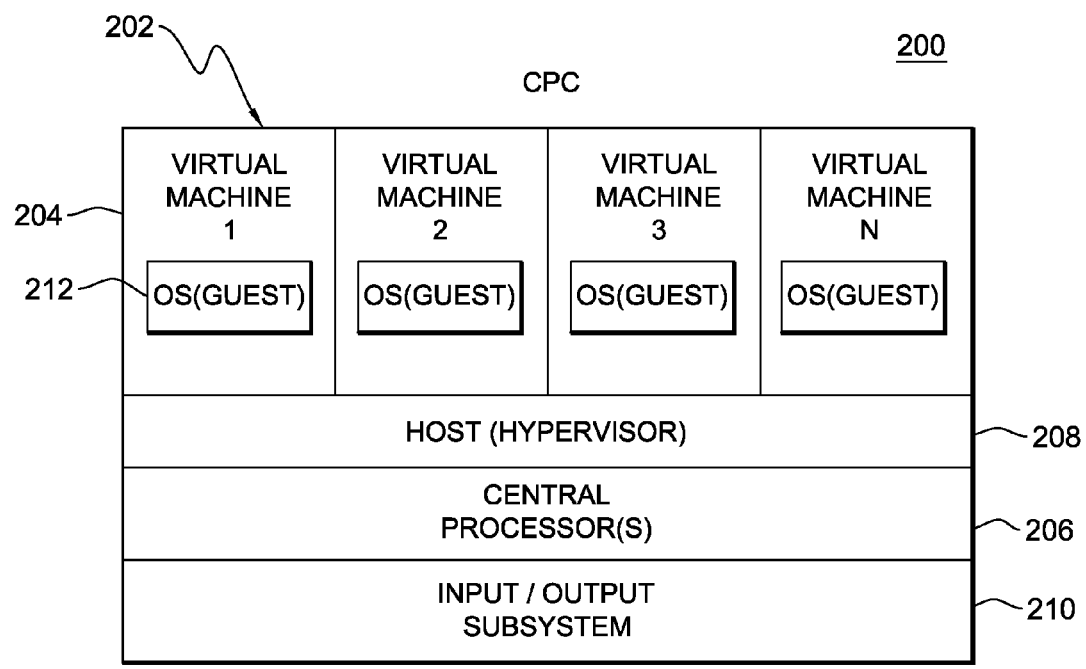
FIG. 2 depicts another embodiment of a computing environment to incorporate and use one or more aspects of the present invention.

Another embodiment of a computing environment 200 to incorporate and use one or more aspects of the present invention is described with reference to FIG. 2. Computing environment 200 is based, for instance, on the z/Architecture® offered by International Business Machines Corporation (IBM®), Armonk, N.Y. The z/Architecture® is described in an IBM® publication entitled, "z/Architecture Principles of Operation," IBM® Publication No. SA22-7832-08, Ninth Edition, August, 2010, which is hereby incorporated herein by reference in its entirety. In one example, a computing environment based on the z/Architecture® includes a System z® server, offered by International Business Machines Corporation, Armonk, N.Y. IBM®, z/Architecture® and zSeries®, as well as z/VM® and z/OS® mentioned below, are registered trademarks of International Business Machines Corporation, Armonk, N.Y., USA. Other names used herein may be registered trademarks, trademarks, or product names of International Business Machines Corporation or other companies.

As one example, computing environment 200 includes a central processor complex (CPC) 202 providing virtual machine support. CPC 202 includes, for instance, one or more virtual machines 204 (or in another embodiment, logical partitions), one or more central processors 206, at least one host 208 (e.g., a control program, such as a hypervisor), and an input/output subsystem 210, each of which is described below. In this example, the virtual machines and host are included in memory.

The virtual machine support of the CPC provides the ability to operate large numbers of virtual machines, each capable of hosting a guest operating system 212, such as z/VM®, z/OS® or Linux, as examples. Each virtual machine 204 is capable of functioning as a separate system. That is, each virtual machine can be independently reset, host a guest operating system, and operate with different programs. An operating system or application program running in a virtual machine appears to have access to a full and complete system, but in reality, only a portion of it is available.

The physical resources of the CPC (e.g., CPUs, memory, I/O devices, etc.) are owned by host 208, and the shared physical resources are dispatched by the host to the guest operating systems, as needed, to meet their processing demands. The interactions between the guest operating systems and the physical shared machine resources are controlled by the host, since the large number of guests typically precludes the host from simply partitioning and assigning the hardware resources to the configured guests.

Central processors 206 are physical processor resources that are assignable to a virtual machine. For instance, virtual machine 204 includes one or more logical processors, each of which represents all or a share of a physical processor resource 206 that may be dynamically allocated to the virtual machine. Virtual machines 204 are managed by host 208. As examples, the host may be implemented in microcode running on processors 206 or may be a part of a host operating system executing on the machine. In one example, host 208 is the Processor Resource/System Manager (PR/SM) offered by International Business Machines Corporation, Armonk, N.Y.

Input/output subsystem 210 directs the flow of information between devices and main storage. It is coupled to the central processing complex, in that it can be part of the central processing complex or separate therefrom. The I/O subsystem relieves the central processors of the task of communicating directly with the I/O devices coupled to the CPC and permits data processing to proceed concurrently with I/O processing.

In one embodiment, the host (e.g., PR/SM) and processor (e.g., System Z®) hardware/firmware interact with each other in a controlled cooperative manner in order to process guest operating system operations without requiring transfer of control from/to the guest operating system and the host. Guest operations can be executed directly without host intervention via a facility that allows instructions to be interpretively executed for a guest. This facility provides an instruction, Start Interpretive Execution (SIE), which the host can issue, designating a control block called a state description which holds guest (virtual machine) state and controls. The instruction places the CPU into an interpretive execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception. One example of interpretive execution is described in "System/370 Extended Architecture/Interpretive Execution," IBM Publication No. SA22-7095-01, September 1985, which is hereby incorporated herein by reference in its entirety.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Figure 3:
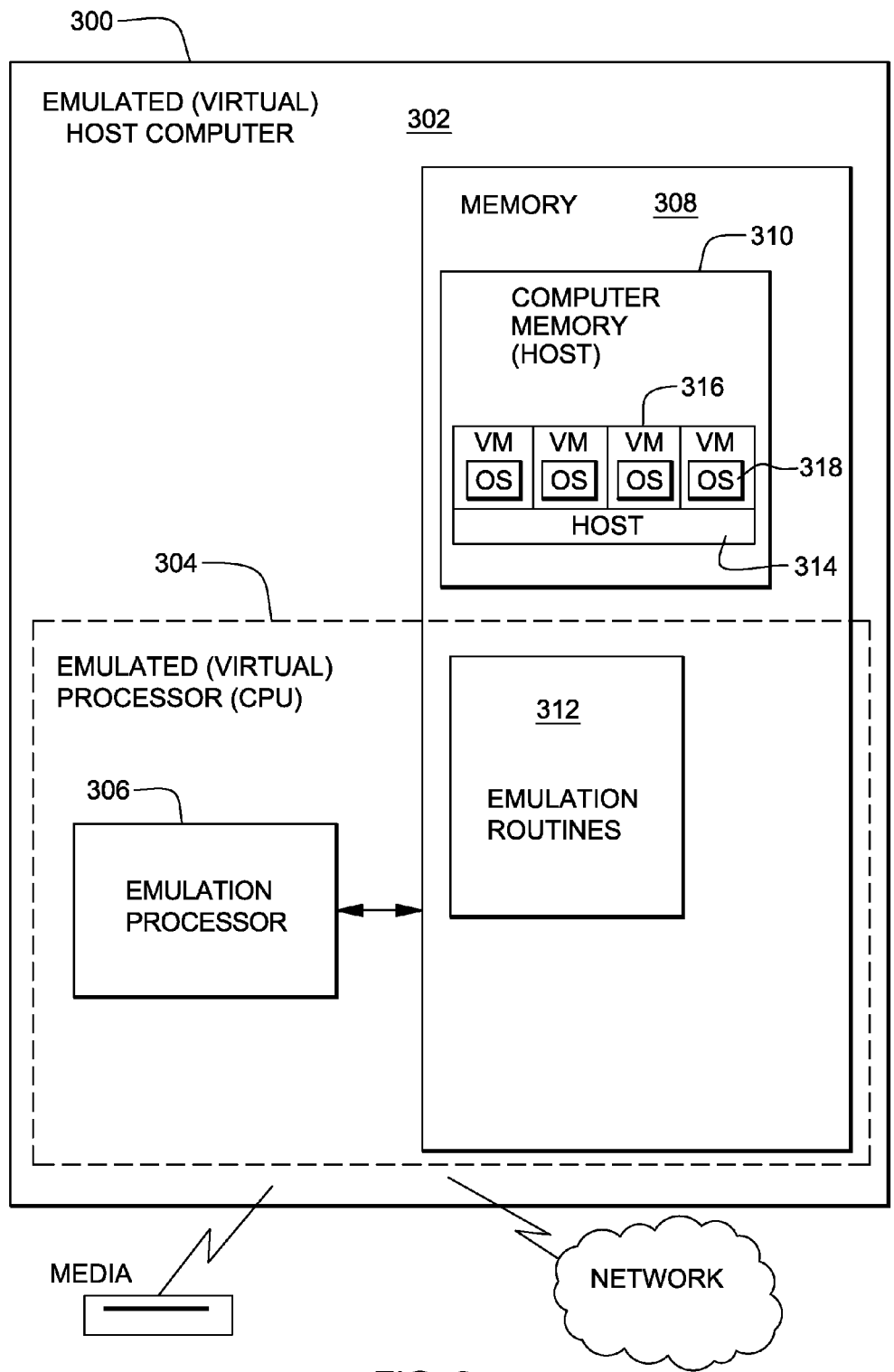
FIG. 3 depicts yet another embodiment of a computing environment to incorporate and use one or more aspects of the present invention.

Another example of a computing environment to incorporate one or more aspects of the present invention is depicted in FIG. 3. In this example, an emulated host computer system 300 is provided that emulates a host computer 302 of a host architecture. In emulated host computer system 300, a host processor (CPU) 304 is an emulated host processor (or virtual host processor) and is realized through an emulation processor 306 having a different native instruction set architecture than used by the processors of host computer 302. Emulated host computer system 300 has memory 308 accessible to emulation processor 306. In the example embodiment, memory 308 is partitioned into a host computer memory portion 310 and an emulation routines portion 312. Host computer memory 310 is available to programs of emulated host computer 302 according to host computer architecture, and may include both a host or hypervisor 314 and one or more virtual machines 316 running guest operating systems 318, analogous to the like-named elements in FIG. 2.

Emulation processor 306 executes native instructions of an architected instruction set of an architecture other than that of the emulated processor 304. The native instructions are obtained, for example, from emulation routines memory 312. Emulation processor 306 may access a host instruction for execution from a program in host computer memory 310 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the host seeks to execute a guest program in a virtual machine. The emulation routines 312 may include support for this instruction, and for executing a sequence of guest instructions in a virtual machine 316 in accordance with the definition of this SIE instruction.

Other facilities that are defined for the architecture of host computer system 302 may be emulated by architected facilities routines, including such facilities as general purpose registers, control registers, dynamic address translation, and I/O subsystem support and processor cache, as examples. The emulation routines may also take advantage of functions available in emulation processor 306 (such as general registers and dynamic translation of virtual addresses) to improve performance of the emulation routines. Special hardware and offload engines may also be provided to assist processor 306 in emulating the functions of host computer 302.

In accordance with an aspect of the present invention, a warning track interruption facility is provided that may be used in many types of computing environments. Although it may be used in many types of environments, aspects of the facility are described herein with reference to a guest multiprocessing system. As described above, in guest multiprocessing systems, guest operating systems dispatch dispatchable units (e.g., programs, code, etc.) on guest central processing units that are hosted by at least one host central processing unit. The host CPU provides a timeslice (e.g., an amount of time or other period, such as number of instructions, number of cycles, etc.) to the guest CPU during which time the dispatchable unit executes. If during execution of the dispatchable unit, the timeslice expires, the dispatchable unit can be left in such a condition that it cannot be continued on any other guest CPU of the guest multiprocessing configuration, regardless of the availability of any other guest CPUs. Instead, it must wait for the one and only guest CPU to receive its next timeslice in order to continue. Based on the particular sharing technique employed and the relative priority of the guest configuration, the next timeslice can be delayed for a substantial period of time. Even if the guest configuration has other guest CPUs that are capable of running the dispatchable unit, continuation of the dispatchable unit is not possible due to the state of the dispatchable unit's guest CPU that was saved when the prior timeslice expired. Until that precise state can be used to continue the guest CPU, the dispatchable unit is inactive.

It is possible to extend the timeslice by granting additional time (or other additional period, such as additional instructions, cycles, etc.), but even with this extra time, the guest CPU could extend execution of the dispatchable unit, and still leave it in the same undispatchable condition as it would be in at expiration of the normal timeslice.

Since a host program does not know the controls and state used by an arbitrary guest program running an arbitrary dispatchable unit, always granting extra time for the guest operating system to clean up its dispatchable unit cannot be done without establishing a protocol between the host program and the guest program. Without a protocol, any extra time granted to the guest CPU would be consumed in the main processing and still possibly conclude with the same dispatchable unit stuck condition. Therefore, in accordance with an aspect of the present invention, such a protocol is provided.

In accordance with an aspect of the present invention, a grace period or extension is provided that includes a warning indicating to the guest program that particular action should be taken (e.g., complete a dispatchable unit or make the dispatchable unit re-dispatchable). As examples, the grace period is provided in response to expiration of the timeslice, or in response to the host pre-empting the guest, prior to expiration of its timeslice, in order to reclaim the processor for some other higher priority, as seen by the host, as described in further detail herein.

As one example, the grace period is provided instead of unconditionally extending the timeslice. If the normal timeslice has completely expired, a grace period is provided, but charged against the next normal timeslice in order to remain fair to all other virtualized guests that each have a timeslice expectation. If the normal timeslice has not expired, the grace period is taken from the normal time remaining Either way, the grace period limits the remaining time (or other period) given to the guest CPU and is not itself extendable. Thus, the guest CPU cannot continue to run for an arbitrary and unknown period.

At the beginning of the grace period, the guest program is notified for the purpose of cleaning up the dispatchable unit (e.g., completing it, stopping it, and/or moving it). Enforcement of the grace period ensures that the guest CPU does not exceed the additional period granted. The protocol by which the guest program is given a grace period and is notified that time (or other period) is almost expired (the grace period has begun) is an agreement between the guest program and the host program that the protocol is understood by the guest program, thereby making such a notification worthwhile. That is, the guest program would normally honor the notification by, when necessary, making the current dispatchable unit dispatchable on another guest CPU of the guest configuration (e.g., moving it).

Further details regarding the protocol and the warning track interruption facility (also referred to as warning track or warning track facility) are described below with reference to FIGS. 4-10. The embodiment described with reference to those figures relates to a virtual environment having one or more guests provisioned by one or more hosts. However, one or more aspects of the present invention relate to other environments as well, including non-virtual environments in which multiple processors and/or multiple programs share resources.

Figure 4:
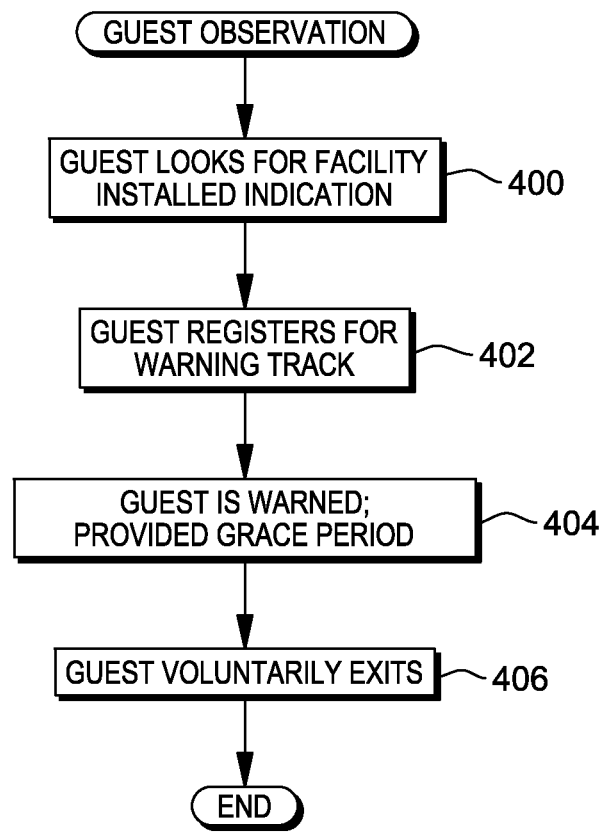
FIG. 4 depicts one embodiment of the logic associated with guest observation of the warning track interruption facility, in accordance with an aspect of the present invention.

With reference to FIG. 4, details regarding the warning track interruption facility protocol as observed by a guest are described. The warning track protocol, as observed by the guest, includes, for instance, a facility installed indication, guest registration, notification and voluntary exit, each of which is described below.

Referring to FIG. 4, the guest program understands the warning track protocol and searches for a facility installed indication, STEP 400. In one example, this indication is a bit stored in a control block (e.g., a Service Call Control Block (SCCB)), which is observed using a read command, such as a Read SCP Information command. Subsequent to determining the facility is installed, the guest program performs registration, STEP 402. Registration is a mechanism in which the guest program communicates to the host program that the guest program understands the warning track interruption facility protocol. In one example, registration is performed using a Diagnose instruction, an example of which is described further below.

Registration initiated from any guest central processing unit covers, in one embodiment, all guest central processing units of the multiprocessing configuration, since consistent behavior across guest CPUs of the guest multiprocessing configuration is desired. In a guest multiprocessing configuration, guest CPUs use the same main memory and it is assumed that the guest CPUs operate in what is sometimes called a single image. Thus, registration of one guest CPU is applicable to the other guest CPUs of the multiprocessing environment. Registration is irrevocable, in one embodiment, and this helps to avoid timing windows, simplifies development and allows for improved testability. Even though registration is irrevocable, the guest program can determine whether it will continue to participate in the protocol. If it so chooses, it need not participate by resetting or having reset one or more enablement indicators described below.

Subsequent to registering the guest program for the warning track protocol, a guest CPU may be notified of a grace period, STEP 404. For instance, it may be warned by a host CPU of expiration of a timeslice (or an impending expiration, in a further example) or of pre-emption of its timeslice. In one particular example, a CPU of a registered guest configuration is notified, for instance, of expiration of its normal timeslice and the beginning of a grace period that provides an additional period to, for instance, clean-up.

Subsequent to being notified, the guest has a constrained amount of time or other period, the grace period (e.g., 50 microseconds in one particular embodiment), to make a dispatchable unit re-dispatchable or to make any other appropriate adjustments. If the normal timeslice has already ended, then before, for instance, returning control to the host, the grace period is used to make the dispatchable unit re-dispatchable or to make any other appropriate adjustments. If the timeslice has not ended, then the grace period is used and any remaining portion of the timeslice is relinquished. Normal accounting of the actual time used by a guest CPU occurs.

Subsequent to making the notification, the guest CPU is in a constrained period (e.g., limited amount of time) after which operation of the guest CPU is involuntarily ended. Only one notification is made for each normal timeslice period. Thus, the guest CPU is still constrained by a final time control which ensures that the underlying shared host CPU can be shared elsewhere, thereby preserving good order and discipline in the overall virtualization provided by the host program.

Notification may be accomplished by any mechanism that causes a unique status to be detected by the guest program. Examples include a unique guest interruption, an architecturally defined main memory location that can be set, or an I/O external memory device available to both host and guest. The first requires an appropriate guest enablement to allow the interruption. The latter two require periodic examinations sufficiently often that the grace period is not wasted. In one particular example of the z/Architecture®, a guest interruption, referred to as a warning track interruption (WTI), is used as notification.

Subsequent to being warned, the guest voluntarily exits its given timeslice/grace period, STEP 406. The guest ends the current timeslice/grace period after being notified and making the dispatchable unit re-dispatchable (e.g., stop and move the dispatchable unit, or complete it). This exit signals to the host program the guest is indeed following the protocol. Other reasons for a guest to relinquish control, thus returning to the host program may occur. Normally, for the constrained processing to make a dispatchable unit re-dispatchable, conditions would not occur for any such extraneous exits. If the guest CPU exits within the grace period via the warning track interruption protocol, a feedback indication is given on the next timeslice, whenever that occurs. Thus, the guest program knows that it met the time constraint imposed by the grace period.

If the guest is tardy on the voluntary exit, its execution is preempted by expiration of the grace period. The next time the guest CPU is started with a normal timeslice, a feedback indication is given so that the guest knows it had been tardy. Generally, this can be used for problem determination in the guest program because the usual grace period allows for sufficient time to clean up and voluntarily exit.

If an extraneous exit occurs, the next time the guest CPU is started within a normal timeslice, it is expected that the voluntary exit would quickly occur. The same feedback mechanism would inform the guest program that an extraneous exit has intervened and thus provide different information to inform problem determination.

The voluntary exit is accomplished by any mechanism that causes control to pass through the host program from the guest program, and which includes the aforementioned feedback mechanism. The mechanism used is to be defined in the warning track interruption protocol of the particular architecture in order for the host program to recognize the guest request. In one example, this mechanism includes the Diagnose instruction described below.

In addition to the guest observation of the warning track interruption protocol, in one embodiment, the host also observes the facility, as described in further detail below with reference to FIG. 5.

Figure 5:
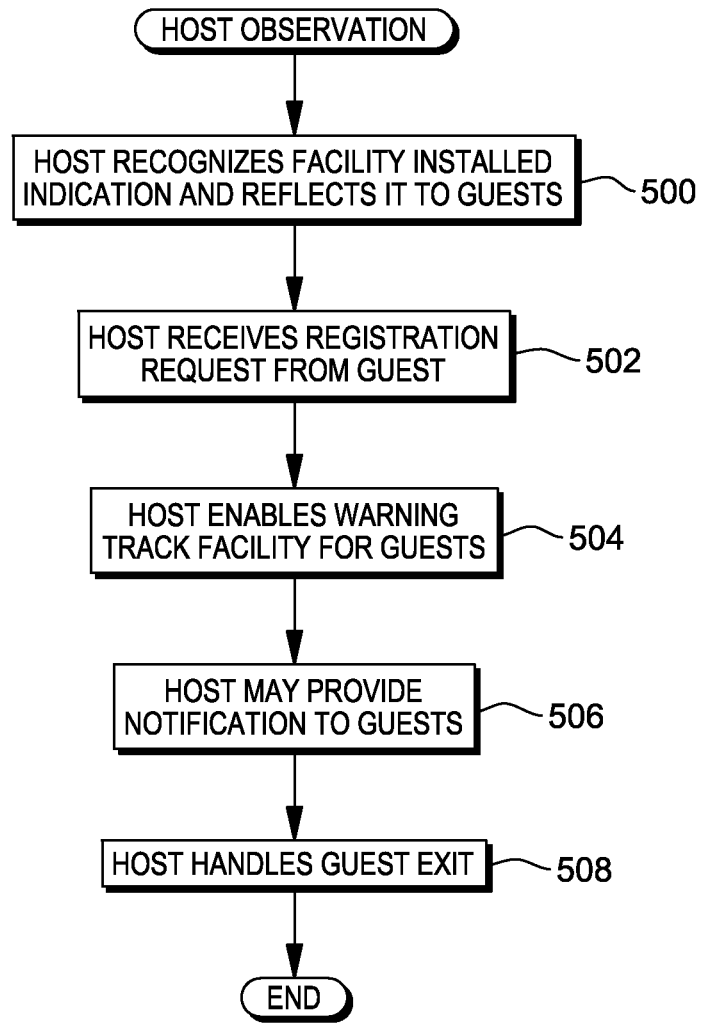
FIG. 5 depicts one embodiment of the logic associated with host observation of the warning track interruption facility, in accordance with an aspect of the present invention.

Referring to FIG. 5, the host recognizes the facility installed indication and reflects it to its guests, STEP 500. For instance, the host checks the installed bit in the control block (e.g., SCCB) and recognizes the installed status of the warning track protocol (i.e., it is set) and knows how the host program may use it to the advantage of the host. Thus, the facility indication is reflected to its guest. For instance, to reflect the facility to a guest, the host sets an installed bit in a guest control block (e.g., guest SCCB) or an area of memory accessible to the guest. If, for any reason, the host program does not want a guest to observe the installed status of the warning track interruption facility protocol and not allow a guest to observe its installed status and use it, the host program passes an uninstalled indication to the guest (e.g., sets the bit seen by the guest to zero). Furthermore, in one embodiment, the host program sets the controls of the guest CPUs such that the warning track protocol is disabled (e.g., turns off one or more designated bits in the state description of the guest CPU).

As registration is initiated by a guest, the host program receives the unsolicited registration request and remembers that the guest has registered, STEP 502. A registration request initiated by any single guest CPU is sufficient to register all guest CPUs in a guest multiprocessing configuration. Thus, the host program enables the warning track protocol for all CPUs of the guest configuration, STEP 504. For instance, the host program sets one or more designated bits in the state description of the guest CPU to enable the warning track interruption facility for the guests. Feedback of registration is not necessarily returned to the guest. Were a guest CPU to attempt registration even when the facility is not installed, the host would ignore the request and would not enable guest CPUs for the warning track interruption facility protocol.

Subsequent to registering and enabling the guests for the warning track facility, a guest may receive notification of invocation of the protocol, STEP 506. This may be accomplished in a number of scenarios, as described below.

As one example, when the warning track interruption protocol is enabled for a guest CPU operating in the interpretive execution mode on a host CPU, say host CPU X, the host program may initiate the protocol from host CPU Y. That is, a guest CPU has been provisioned with a host CPU X and that host CPU X is presently not available to the host program. If the host program has reason to reacquire CPU X, it first causes CPU X to exit the interpretive execution mode. That is, the guest CPU is stopped, thereby exiting the interpretive execution mode of CPU X. Stopping the guest CPU at any arbitrary point without allowing the guest CPU to voluntarily stop itself creates a risk of a problem of which the warning track interruption protocol is meant to solve. The warning track interruption protocol allows host CPU Y to request notification by allowing a host program action to be transformed into a notification in guest CPU X, STEP 506. Since the guest program has previously registered, the host program has an expectation that the guest program recognizes the notification and supports appropriate handling of the notification including the last step of voluntarily ending execution, thus returning control of host CPU X to the host program. Once this occurs, the host program can proceed with whatever use of host CPU X might have caused the process to be initiated.

The host program notifies a guest by, for instance, setting any status, setting an indicator (e.g., a bit), or causing an unsolicited, asynchronous signal (e.g., a warning track interruption) to be sent to the guest. Although registered, the time of receipt of such a notification signal is still unknown in the guest. By registering, the guest has just agreed to adhere to the protocol if and when signaled.

In a host uniprocessor system, if the one host CPU is in the interpretive execution mode such that the guest CPU is operating, no other host CPU exists to invoke the warning track interruption protocol. However, even in this case, the warning track interruption protocol can be invoked by the CPU itself when the host CPU, while in the interpretive execution mode, recognizes the timeslice expiration, and can then grant a grace period and perform the notification.

In a further example of notification, notification occurs when, due to an internal status change recognized by the host CPU when it is in the interpretive-execution mode, the host CPU causes the notification defined in the warning track interruption protocol to be sent to the guest CPU. An example of this occurs when the guest CPU is enabled for the warning track interruption protocol and the host CPU recognizes the end of the timeslice. Before signaling the guest CPU to relinquish control, the CPU internally grants a grace period to allow the guest CPU sufficient time to receive the signal, to take appropriate action (e.g., complete the current dispatchable unit or make the current dispatchable unit re-dispatchable), and to voluntarily end. Internally, the host CPU retains state to indicate that the guest CPU has been notified. If the guest does not voluntarily end within the grace period, the CPU recognizes this and ends execution of the guest, thereby returning control to the host program by ending the interpretive-execution mode. The guest has no way to determine, in one embodiment, why the protocol was invoked, but only that it was notified to clean up and end. Other host rationales may exist for causing an end of interpretive-execution mode, and thus, ending guest execution. For example, scenarios exist where execution of all guest CPUs are to be stopped in order to make some coordinated change to the entire guest configuration. A multiprocessing guest configuration is not to have some CPUs operating under different rules or assumptions from other CPUs of the guest configuration. Such asymmetry could create unpredictable guest results.

The host CPU receives the effect of the guest CPU having performed the voluntary exit or exit for any other reason (e.g., the host is returned the CPU resource), STEP 508. If the exit is due to what the warning track interruption protocol defines, then the host program remembers to provide a feedback to the guest CPU the next time it is started, however long that may be. This feedback is a positive ("good") indication, assuming the guest voluntarily exited prior to expiration of the grace period. If the exit is due to any other reason, no warning track interruption protocol feedback occurs at the next start of the guest CPU.

If the guest is tardy on the voluntary exit; that is, the guest performs an action to voluntarily exit, but the grace period has expired, execution of the guest CPU is preempted by expiration of the grace period. The next time the guest CPU is started with a normal timeslice, an exception feedback indication is given so that the guest knows it had been tardy in its voluntary exit. Generally, this can be used for problem determination in the guest program because the usual grace period allows for sufficient time to clean up and voluntarily exit.

If an exit occurs other than the voluntary exit of the warning track interruption protocol, the next time the guest CPU is started with a normal timeslice, no feedback per the warning track protocol is included.

The means to exit voluntarily is accomplished by any mechanism that causes control to pass to the host program from the guest program, which is recognized by the host program as the protocol voluntary exit, and which includes the aforementioned feedback mechanism. In one example, a Diagnose instruction is used for the voluntary exit. That is, the Diagnose instruction with a particular parameter is used to indicate completion of the timeslice. After the Diagnose instruction is issued by the guest program and executed, the host program determines if the exit was on time. Then, when the guest is started again, which is at the next sequential instruction after Diagnose, a condition code indicating whether it was on time is provided. The condition code is set, for instance, in the guest PSW that is used to start the guest at the next sequential instruction. The guest can then test the condition code.

Figure 6:
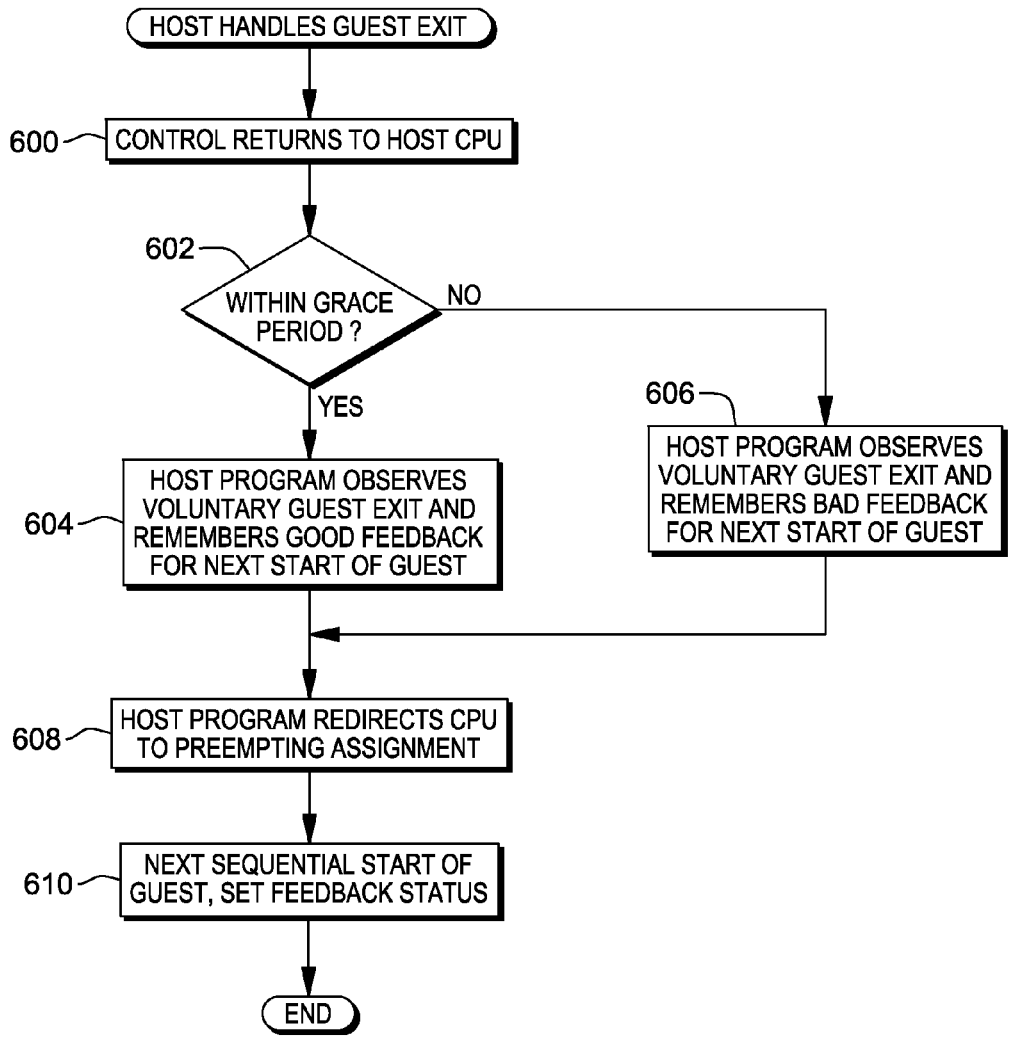
FIG. 6 depicts one embodiment of the logic associated with a host handling a guest exit, in accordance with an aspect of the present invention.

The handling of the guest voluntary exit by the host is further described with reference to FIG. 6. Initially, control returns to the host CPU, when the guest CPU stops, STEP 600. A determination is made as to whether control returned within the grace period, INQUIRY 602. If control returned within the grace period, then the host program observes a voluntary guest exit per the warning track interruption protocol and remembers good feedback for the next start of the guest CPU, regardless of which host CPU might provision the guest CPU at that time, STEP 604. This is assuming the warning track interruption facility is installed. If not, feedback status is not remembered. However, if the guest performs an action to voluntarily exit but it is outside of the grace period, INQUIRY 602, then the host program on the host CPU observes a voluntary guest exit per the warning track interruption protocol (even though it was untimely and had to be involuntarily exited) and remembers bad feedback for the next start of the guest CPU, regardless which host CPU might provision the guest CPU at that time, STEP 606. Again, this is assuming the warning track facility is installed. If not, feedback status is not remembered.

Thereafter, whether the host is remembering good or bad feedback, the host program redirects the host CPU to a preempting assignment, STEP 608. That is, the host is redirected to perform one or more functions now that it has its resources (CPU) back.

Moreover, at the next sequential start of the guest CPU, regardless of which host CPU provisions the guest CPU, if feedback status is remembered, the feedback status indication is set prior to starting the guest CPU, STEP 610. In one example, it is set in the SIE state description, e.g., in the PSW of the state description, which indicates the start of the next sequential instruction.

Figure 7:
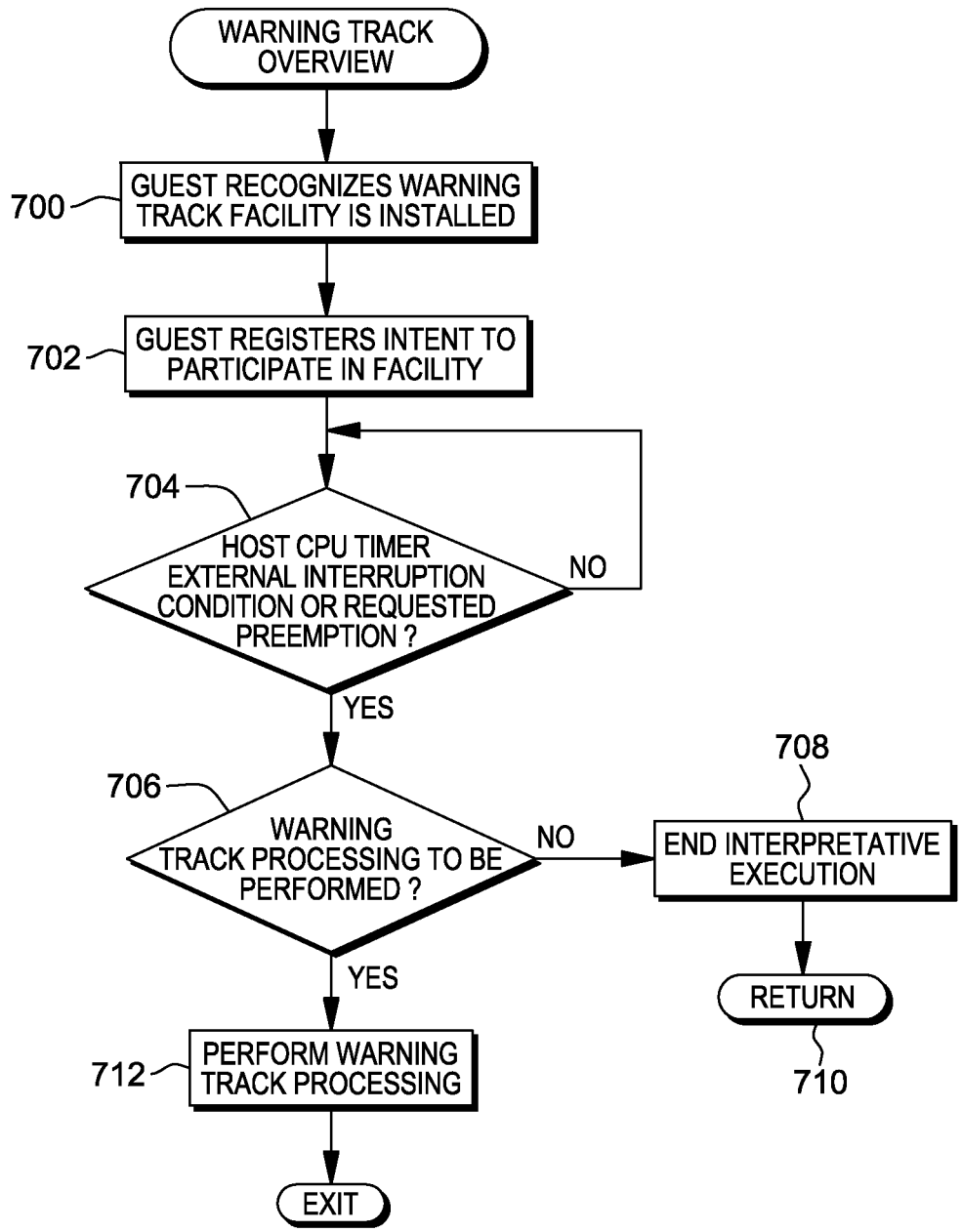
FIG. 7 depicts one embodiment of an overview of the warning track interruption facility logic, in accordance with an aspect of the present invention.

Further details regarding processing associated with the warning track interruption facility are described with reference to FIGS. 7-9. In particular, FIG. 7 depicts one embodiment of the logic associated with an overview of the warning track interruption facility processing; FIGS. 8A-8C provide details of the warning track interruption facility processing, in accordance with an aspect of the present invention; and FIG. 9 depicts one embodiment of the logic associated with receiving a warning track interruption.

Referring to FIG. 7, initially a guest program (e.g., guest operating system) recognizes that the warning track interruption facility is installed, STEP 700. In one embodiment, this is accomplished by the guest program observing an installed facility indicator (e.g., bit) that is located, for instance, in a designated control block. If the guest operating system has the support to participate in the warning track interruption facility, it recognizes the warning track interruption facility installed indicator and then indicates its ability to participate in the protocol. In one example, this includes registering its intent to participate in the warning track processing, STEP 702. As described herein, in one example, registration is performed via a Diagnose instruction. When registered, the guest operating system indicates to both the host CPU and the host program that it knows how to handle a warning track interruption (WTI), which is a non-ambiguous interrupt which provides a warning to the guest that it is, for instance, about to lose access to its shared resource (e.g., guest CPU) and that it is, for instance, to take action with respect to its currently executing dispatchable unit. Registration is a prerequisite, in one embodiment, for receipt of the WTI. If the guest is not registered for the warning track interruption facility, upon expiration of the guest's timeslice, no grace period is offered, and the guest CPU is taken out of interpretative execution mode.

Even if registered, in one embodiment, the guest program has two mechanisms to disable presentation of the WTI. For instance, a selected bit in, for instance, the program status word (PSW) can be set to zero which disables presentation of all external interruptions, including WTI; or a bit in a specified control register (e.g., CR0) can be set to zero to disable just the WTI. When both bits are one, presentation of the WTI is enabled. If presentation of a WTI remains disabled for the entire WTI grace period, execution of the guest ends without the benefit of the WTI, which constitutes an involuntary exit.

During interpretive execution of the guest CPU, if the guest CPU internally recognizes either a host CPU timer external interruption condition (e.g., an expired timeslice) or a preemption requested by the host program, INQUIRY 704, internal CPU processing determines, prior to the host receiving control, if the warning track interruption processing is to be performed, INQUIRY 706. That is, the internal CPU processing checks that the guest is enabled for warning track processing and therefore determines that the warning track processing should be included in the processing to be performed. If the warning track interruption processing is not to be performed, then interpretive execution of the guest ends, STEP 708, and control returns to the host program, STEP 710. Returning to INQUIRY 706, if, however, the warning track interruption processing is to be performed, then that processing is performed, as described in further detail below, STEP 712.

Embodiments of further details of the warning track interruption processing are described with reference to FIGS. 8A-8C. In this processing, a number of control indicators are employed including the following:

A warning track interruption facility grace period active internal control (e.g., G bit), which is not architecturally visible, but is used by the internal CPU logic;

A warning track interruption (WTI) presented internal control (e.g., P bit), which indicates, when one, that the WTI has been presented to the guest and when zero indicates that it has not been presented. Like the warning track interruption facility grace period active internal control, the WTI presented internal control is not architecturally visible, but is used by the internal CPU logic;

A host program preemption of the guest control (e.g., T bit), which is, for instance, the warning track intervention request indicator in the guest CPU state description; and Enablement of external interruptions exist, when an E indicator is one. In one example, the E indicator is a bit within the current program status word (PSW).

Figure 8A:
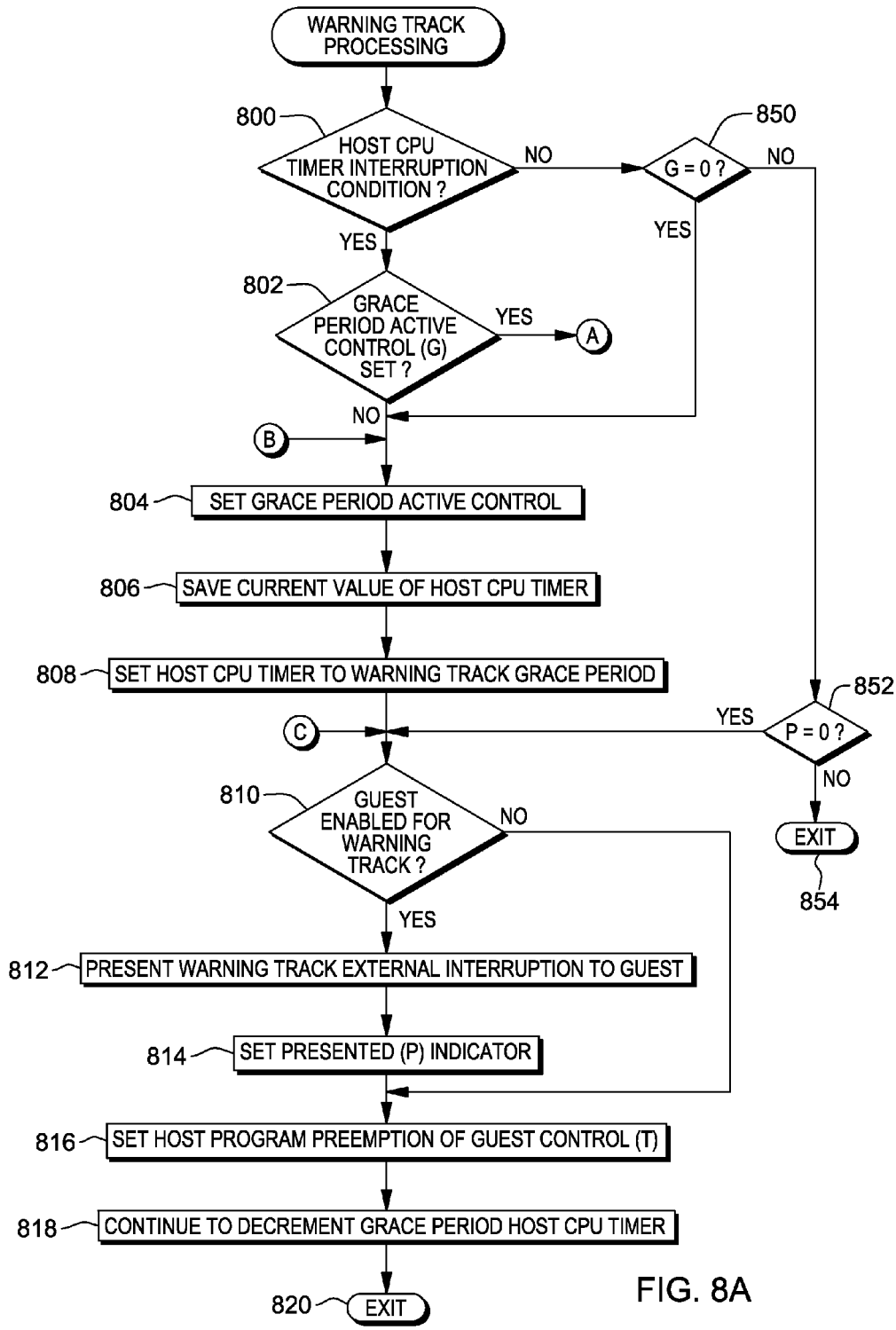
FIGS. 8A-8C depict embodiments of the logic associated with the warning track interruption facility processing, in accordance with an aspect of the present invention.
Figure 8B:
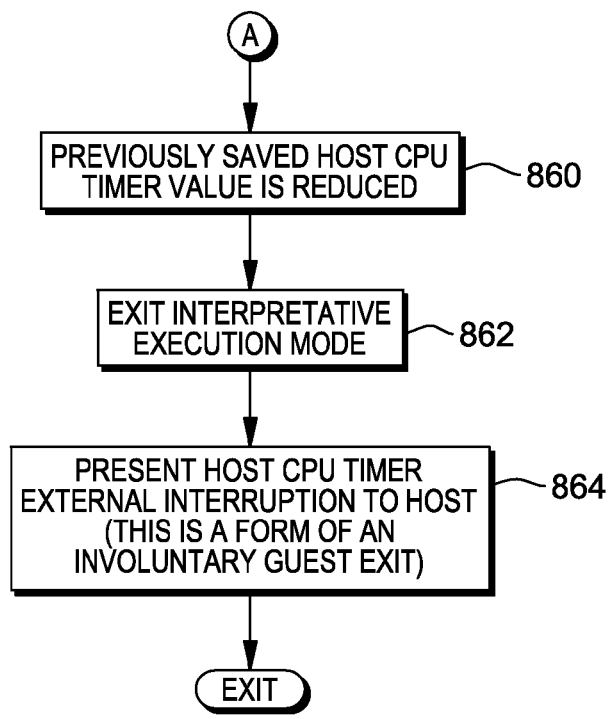
Figure 8C:
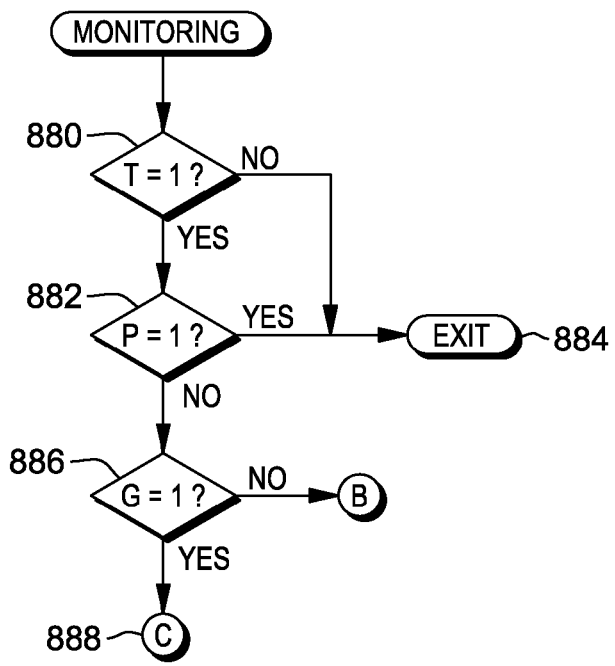
Figure 9:
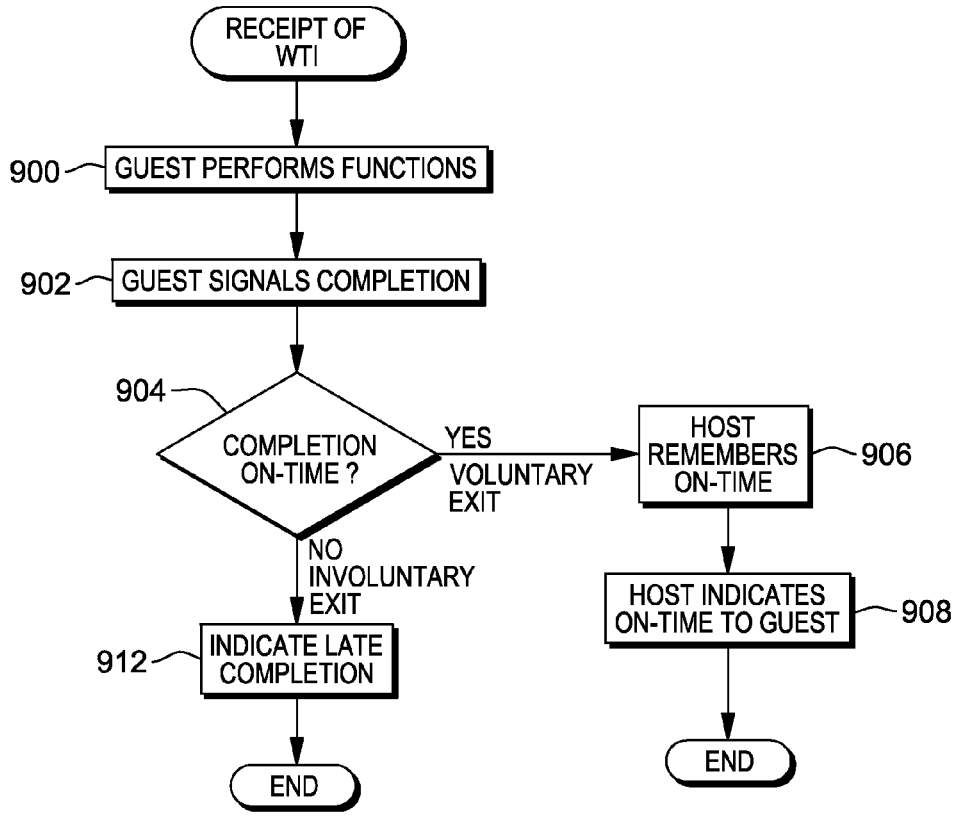
FIG. 9 depicts one embodiment of the logic associated with receiving a warning track interruption, in accordance with an aspect of the present invention.

Referring to FIG. 8A, in one example, either a host CPU timer interruption condition is recognized (e.g., expired timeslice) or a warning track intervention request (e.g., host wants early return of CPU resources; i.e., prior to end of timeslice) is recognized. If a host CPU timer interruption condition is recognized, INQUIRY 800, a determination is made as to whether the grace period active control indicator is set (e.g., is G equal to 1), INQUIRY 802. If G is not set, then the G indicator is set to, for instance, 1, STEP 804, and the warning track interruption facility grace period is about to begin. The current value of the host CPU timer is then saved (the saved value is called the original value herein), STEP 806, and the host CPU timer is set to the warning track grace period (e.g., 50 microseconds), STEP 808.

Thereafter, a determination is made as to whether the guest is enabled for a warning track interruption, INQUIRY 810. In one embodiment, if guest level 2 is active indicating that one guest has started another guest, then Guest 2 exits the interpretive execution mode as for a Guest 1 interruption, and the Guest 1 Start Interpretive Execution instruction is nullified. Thus, processing is as a Guest 1 at this point. If Guest 2 is not active, then processing just continues with the Guest 1. If the guest is enabled for a WTI, then the warning track external interruption (WTI) is presented to the guest, STEP 812. In one example, this interruption includes a particular interruption code that is presented indicating that it has a grace period in order to perform one or more functions (e.g., cleanup), if desired.

Further, P is set to 1 indicating that the WTI has been presented, STEP 814. Also, the T bit is set to 1 using an interlocked update function (it may have already been 1 if an intervention request had originally been used), STEP 816. The grace period in the host CPU timer continues to be decremented, regardless of whether the WTI was presented, STEP 818. This processing is then exited, STEP 820. In one example, a designation of exiting this process indicates that the CPU has completed the current processing of the warning track interruption facility and it is returning to other processing as dictated by the current state of the CPU.

Returning to INQUIRY 810, if the guest is not enabled for warning track interruption, processing proceeds to STEP 816. In this instance, the guest is not enabled for WTI, so it cannot be presented to the guest. However, the T bit is set pending so that it can be detected later when the guest does enable for WTI.

Returning to INQUIRY 800, if it is not a host CPU timer interruption condition, then a warning track intervention request is recognized (i.e., host preemption). That is, the T bit in the intervention request field of the guest's state description is 1. Thus, a determination is made as to whether the G indicator is set, INQUIRY 850. If it is not set (e.g., 0), then processing continues with STEP 804. In this situation, the T equals 1 condition is the initial reason to start the WTI process. However, if the G bit is set, then a determination is made as to whether P is set, INQUIRY 852. If P is not set (e.g., equal to 0), then processing continues with STEP 810 in an attempt to present the WTI. However, if P is set (e.g., not equal to 0), then the discovery of T equals 1 after the warning track facility grace period has begun has no effect, and the process is exited, STEP 854.

Returning to INQUIRY 802, if G is set (e.g., equal to 1), the guest CPU has already been running in the grace period and expiration of the host CPU timer indicates that the grace period has expired. Thus, a WTI cycle had previously been initiated and the grace period has expired. Therefore, referring to FIG. 8B, the previously saved original host CPU timer value is reduced by the amount of time actually used during the grace period and then loaded into the host CPU timer, STEP 860. Interpretive execution mode is exited, STEP 862, and the host CPU timer external interruption is presented to the host, STEP 864 (this is a form of an involuntary guest exit).

In addition to the above, WTI analysis can be initiated via certain instructions that can enable the CPU for WTI. For instance, referring to FIG. 8C, initially, a number of instructions that can enable the CPU for WTI, including, for instance, a Load PSW (Extended) instruction and a Store Then or System Mask instruction that can set the designated bit in the PSW, and Load Control that can set the selected bit in the control register, perform monitoring, as described herein. For instance, an instruction that can enable for interrupts checks the T bit for potential warning track processing. If T=0, INQUIRY 880, then there is no WTI, and this process is exited, STEP 884. However, if T=1, then processing continues with INQUIRY 822.

At INQUIRY 882, a determination is made as to whether P is set (e.g., equal to 1). If so, then this process is exited, STEP 884, since the enablement had previously been detected. However, if P is not set (e.g., not equal to 1), then a further determination is made as to whether G is set (e.g., equal to 1), INQUIRY 886. If not, then processing continues with STEP 804 (FIG. 8A). However, if G is set (e.g., equal to 1), STEP 886 (FIG. 8C), then processing continues with INQUIRY 810 in FIG. 8A, STEP 888, and the processing is exited.

Further details of the processing of the warning track interruption are described with reference to FIG. 9. When the guest program receives the warning track interruption, it performs whatever functions (e.g., OS functions) it is to perform in order to, for instance, make the dispatchable unit of work re-dispatchable, STEP 900. For instance, the guest stops the dispatchable unit at a particular point, saves it's state, and either moves it to another guest CPU or enables it to be moved by providing state information, etc. The guest operating system signals it has finished by issuing a warning track cleanup complete signal to the host program (a.k.a., a voluntary exit), STEP 902. This signal can be any mechanism that causes guest operation to relinquish the remaining timeslice. However, it is to be recognized by the host program as the cleanup part of the protocol. In one example, a cleanup completed function of the Diagnose instruction is used.

If the guest program issues the cleanup completed signal before the grace period expires, INQUIRY 904, the host program remembers that the guest CPU exited in time, STEP 906. This is a voluntary exit. When the guest CPU is next started, the on-time nature of the signal is indicated back to the guest CPU, STEP 908. In one example, a guest resumption PSW is set to indicate a successful condition code (e.g., condition code 0).

Returning to INQUIRY 904, if the guest program, for whatever reason, takes too long, the grace period expires by virtue of the host CPU timer having decremented the grace period to zero, thus presenting a host CPU timer external interruption condition to the CPU. In this case, the CPU recognizes that the guest was already in the grace period and does not grant another grace period. Instead, guest execution stops and control reverts to the host program by receipt of the external interruption. A host program recognizes that this ending of the guest CPU is an involuntary guest exit.

At the next guest CPU start, the guest operating system may then issue a cleanup completed signal, albeit now too late. The host program no longer has an expectation of waiting for receipt of the cleanup completed signal. So, the next time the guest CPU is started, the too late nature of the signal is indicated back to the guest CPU, STEP 912. In one example, the guest resumption PSW is marked to indicate a late condition, which will be viewed by the guest at the next start. Issue of a too late Diagnose instruction is sometimes called a stale Diagnose instruction because it previously missed exiting within the grace period and then later exited for no good reason.

In one example, upon a new start of the guest CPU, the guest program can check the signal resumption part of the protocol for whether the signal had or had not been issued within the grace period. The guest program can use this information to investigate why it might have been delayed and make improvements to improve the statistics of being more timely in the future.

In one embodiment, when the guest is disabled for all external interruptions, a number of instructions that can enable external interruptions perform monitoring. When the guest is enabled for external interruptions, a WTI enablement is examined. At this point, if WTI is enabled and the P bit is 0, the WTI is presented to the guest CPU.

As mentioned above, in one embodiment, a Diagnose function is used to indicate cleanup is completed or to register for the warning track interruption facility. For cleanup completed, the Diagnose function, when issued with a cleanup parameter and executed, signals that the issuing CPU has performed any desired processing associated with the receipt of a warning track external interruption. When execution completes, a condition code is set indicating whether completion was issued within the model-dependent time interval allowed for cleanup after the warning track interruption or not.

As for the register function, the Diagnose function, when issued with the register parameter and executed, signals that the issuing configuration understands the warning track interruption. When execution completes, a successful condition code is set. The registration status is cleared by a system reset.

Figure 10:
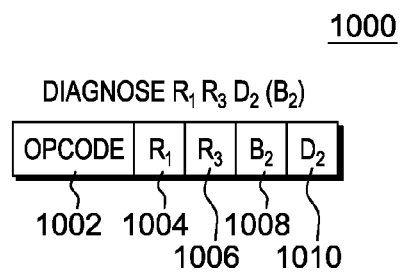
FIG. 10 depicts one embodiment of a format of a Diagnose instruction used in accordance with an aspect of the present invention.

One embodiment of a format of a Diagnose instruction is described with reference to FIG. 10. In one embodiment, a Diagnose instruction 1000 includes an opcode 1002 indicating the Diagnose function; a first register field 1004 ($R_1$); a second register field 1006 ($R_3$); a general register field 1008 ($B_2$); and a displacement field 1010 ($D_2$). In one example, the contents of the $D_2$ field are added to the contents of general register $B_2$. The result is not used to address data, but instead, certain bits (e.g., bits 48-63) are used as an operation code extension. When the operation code extension is a predetermined value, warning track cleanup completed is specified and a timeslice is relinquished.

In one example, the $R_3$ field is unused and it contains zeros. Further, specified bits of general register $R_1$ are unused and are to contain zeros and a particular bit of general register $R_1$ (e.g., bit 63) specifies the cleanup completed function when zero and the register function when 1.

In a logical partition using shared physical CPUs, this function may improve system performance by allowing the physical CPU on which the logical CPU is running to be assigned to another logical CPU.

Beyond Diagnose, any other SIE exit while in the WTI grace interval, whatever the cause, similarly restores the original value of the host CPU timer decremented by the amount of grace period time expended.

Described in detail herein is a warning track interruption facility that provides, in one embodiment, a mechanism by which a warning track external interruption can be presented to a CPU in a configuration with shared CPU resources, such as a logical partition. The control program can use the warning track external interruption as the signal to make the currently executing dispatchable unit dispatchable on a different CPU on the configuration.

In one embodiment, a logical (guest) processor running in a timeslice on a physical processor receives a warning signal indicating a grace period, e.g., an amount of time before the logical processor will be interrupted (deallocated from the physical processor that may be shared) enabling the work being done by the logical processor to be either completed or moved to another logical processor. As an example, the guest CPU is signaled that it's timeslice is expired and that it should preempt the current dispatchable unit of work (DU) to make it re-dispatchable on another guest CPU. In one example, the warning signal is an interruption having an interruption code that indicates it is a WTI. In a further example, the interruption code includes information about the amount of time or other period given to the grace period.

In one embodiment, the warning track interruption facility can be used in non-virtual, as well as virtual environments, in which one program and/or processor shares resources (e.g., CPU resources, or other resources) with one or more other programs and/or processors.

In one embodiment, in which the environment is a virtual environment, from a guest's perspective the:
1. Guest program observes the installed condition of the warning track interruption protocol facility.
2. Guest program registers for the warning track interruption protocol.
3. Guest CPU receives a warning track notification, according to the particular architecture (e.g., shared memory indication, shared I/O device indication, interruption).
4. Guest program executing on the guest CPU performs applicable processing according to the nature of the guest program having received the notification (processing of notification expected to be unique per operating system).
5. Guest CPU relinquishes control according to the warning track protocol voluntary technique.
6. At next start of guest CPU, guest program may observe feedback, according to warning track protocol.

Further, in one embodiment, from the host's perspective:
A. Host program observes the installed condition of the warning track interruption protocol facility.
   1. Host program acquires the warning track interruption protocol facility installed indication.
   2. Host program persistently remembers the installed status of the warning track interruption protocol.
   3. Host program indicates the warning track protocol installed status to each guest configuration.
   4. Host program disables the warning track protocol in all unregistered guest CPUs.
   5. Host program prepares to recognize a guest warning track registration request from each guest configuration.
B. Host program recognizes a warning track registration request from a guest.
   1. Host program persistently remembers that the guest configuration understands the warning track protocol.

2. Host program enables guest for warning track protocol.
C. During normal guest CPU X operation, preemption of the guest CPU X is used to re-acquire the corresponding host CPU X.
  1. Host program in CPU Y signals notification to guest CPU X.
    a. CPU X propagates notification to guest CPU X via update of shared memory location, update of shared I/O device, or interruption to guest CPU X, according to warning track protocol.
D. Guest CPU X stops, returning control to host CPU X.
  1. If within grace period, host program on CPU X observes voluntary guest exit per warning track protocol and remembers good feedback for next start of guest CPU X, regardless of which host CPU might provision guest CPU X at that time.
    a. If within grace period, but exit of guest CPU X is not according to the warning track protocol, feedback status is not remembered.
  2. If not within grace period, host program on CPU X observes voluntary guest exit per warning track protocol and remembers bad feedback for next start of guest CPU X, regardless of which host CPU might provision guest CPU X at that time.
    a. If not within grace period, but exit of guest CPU X is not according to the warning track protocol, feedback status is not remembered.
  3. Host program on host CPU X redirects CPU X to preempting assignment.
E. Next sequential start of guest CPU X, regardless of which host CPU provisions guest CPU X, if feedback status is remembered, set feedback indication, according to the warning track protocol before starting the guest CPU X.

In one embodiment, a guest processor of the guest configuration receives a unique interruption, that interruption being defined for a computer architecture, and the meaning of the interruption being a warning track interruption. The interruption indicates a specific code which identifies the interruption as a warning track interruption. The interruption implies a relatively short time interval, referred to as a grace period, leading up to ending a guest processor execution.

During the grace period, in one example, the guest program is nominally expected to make the current dispatchable unit of work re-dispatchable on another guest processor, thus avoiding being stuck on the current guest processor, awaiting its next, normal timeslice start from the host.

In one example, the relatively short time interval is granted only once per host program start of the guest processor. The time interval is granted from, for instance, the existing time interval under which the guest processor is running. Since the granted time interval is allocated from the normal remaining timeslice, it is not borrowing time, per se, but is using a constrained amount of time from the current time interval to ensure that the guest processor is indeed preempted in a relatively short period of time.

In a further example in which the current timeslice has expired, the time interval is granted as extra time in addition to the existing time interval under which the guest processor is running. The granted time interval is accounted for by the host program as against the expected next, sequential normal time interval that will be consumed by the guest processor under which the guest processor is expected to next be running. It is still intended to ensure that the guest processor is indeed preempted in a relatively short period of time.

In one example, an interruption request for a warning track event may be generated to inform the program it is nearing the end of the current execution interval on a shared CPU. The interruption request is a pending-condition type which is generated when the configuration is registered and is enabled for the warning track interruption facility.

The cooperative processing between the programs (e.g., host and guest) optimizes resource sharing (e.g., CPU) among programs (e.g., guest operating systems). One or more aspects provide, for instance, better response time with the same CPU utilization. Further, system serialization is released prior to undispatch by the hypervisor.

In a further embodiment, one or more aspects of the invention can be used with requests from an operating system to let an individual execution thread continue to improve elapsed time of time sensitive work. That is, a thread may request or be provided additional time to perform a function.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 11:
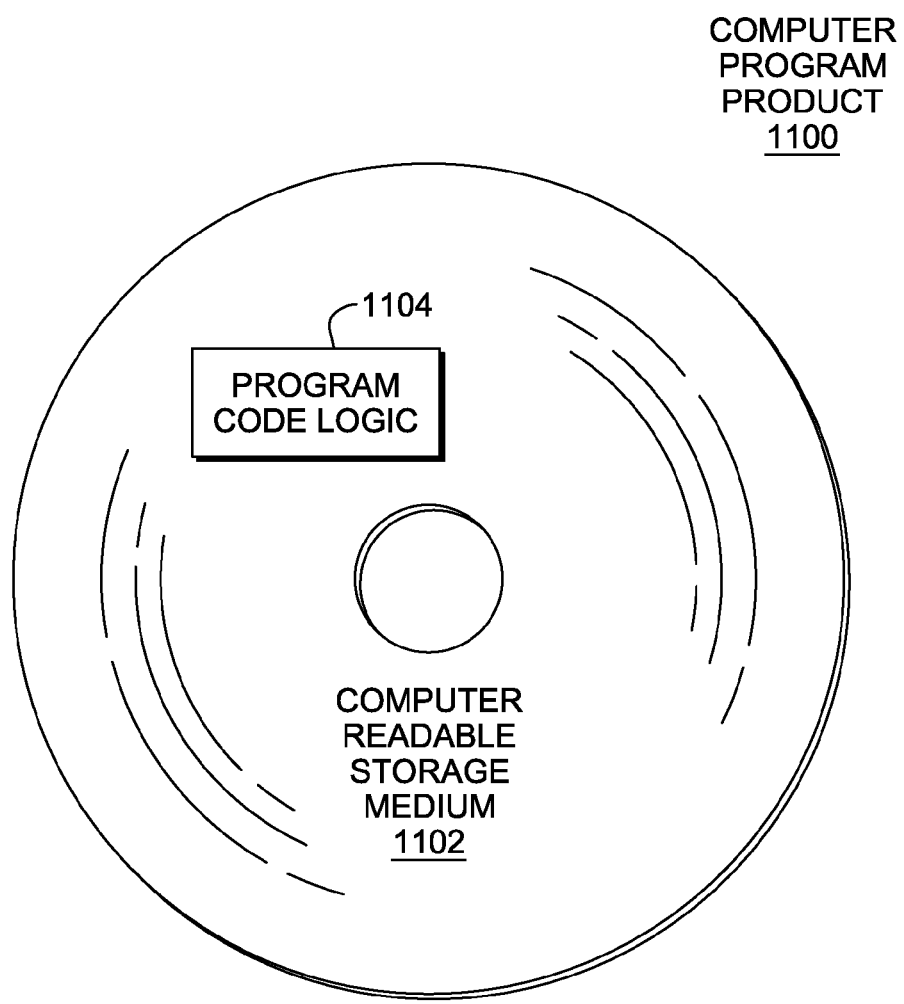
FIG. 11 depicts one embodiment of a computer program product incorporating one or more aspects of the present invention.

Referring now to FIG. 11, in one example, a computer program product 1100 includes, for instance, one or more non-transitory computer readable storage media 1102 to store computer readable program code means or logic 1104 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, the grace period may be other than an amount of time, such as a number of instructions or cycles or any other quantifiable value. Many changes and/or additions may be made without departing from the spirit of the present invention.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Other examples of computing environments that may incorporate and/or use one or more aspects of the present invention are described below.

Figure 12:
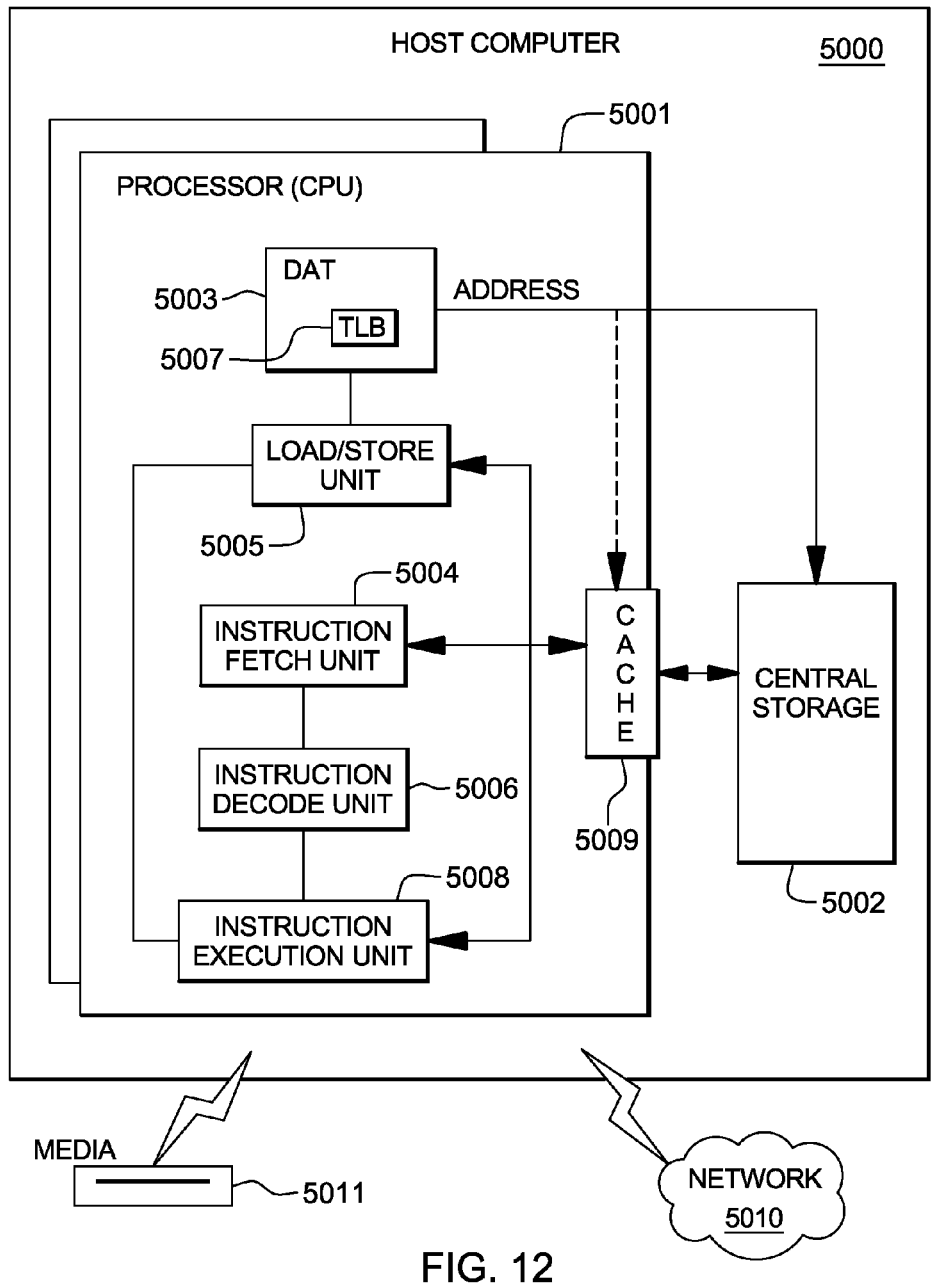
FIG. 12 depicts one embodiment of a host computer system to incorporate and use one or more aspects of the present invention.

Referring to FIG. 12, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects the present invention). Referring to FIG. 12, software program code which embodies one or more aspects of the present invention may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 13:
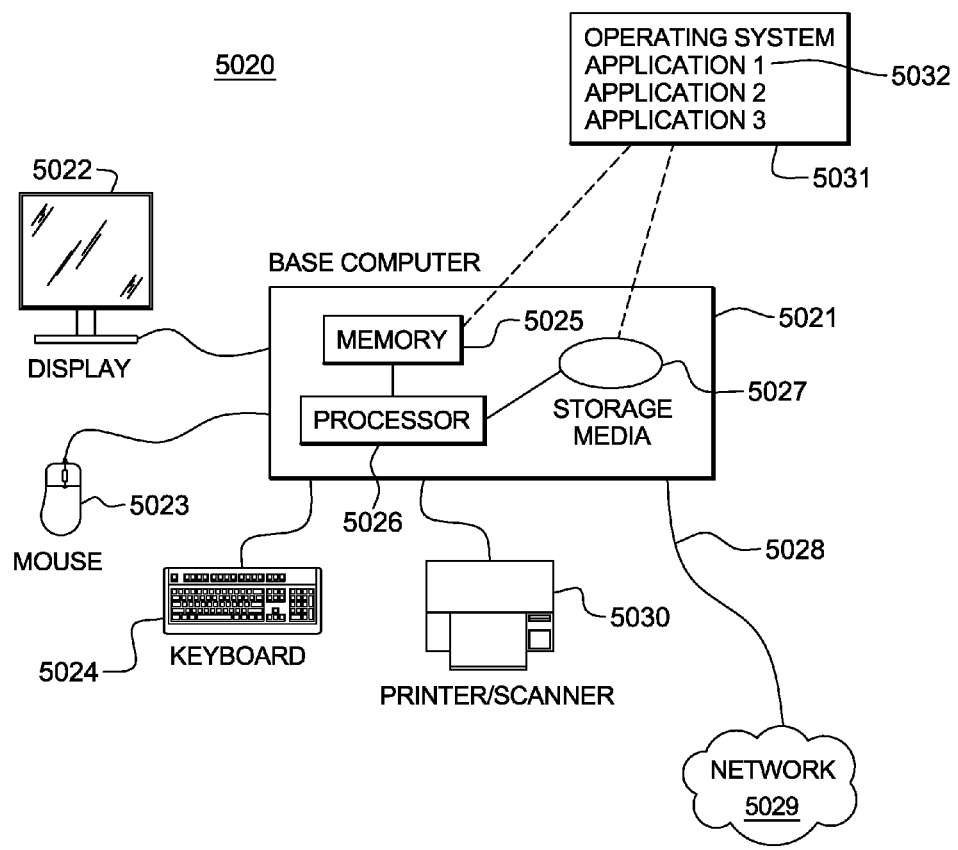
FIG. 13 depicts a further example of a computer system to incorporate and use one or more aspects of the present invention.

FIG. 13 illustrates a representative workstation or server hardware system in which one or more aspects of the present invention may be practiced. The system 5020 of FIG. 13 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 14:
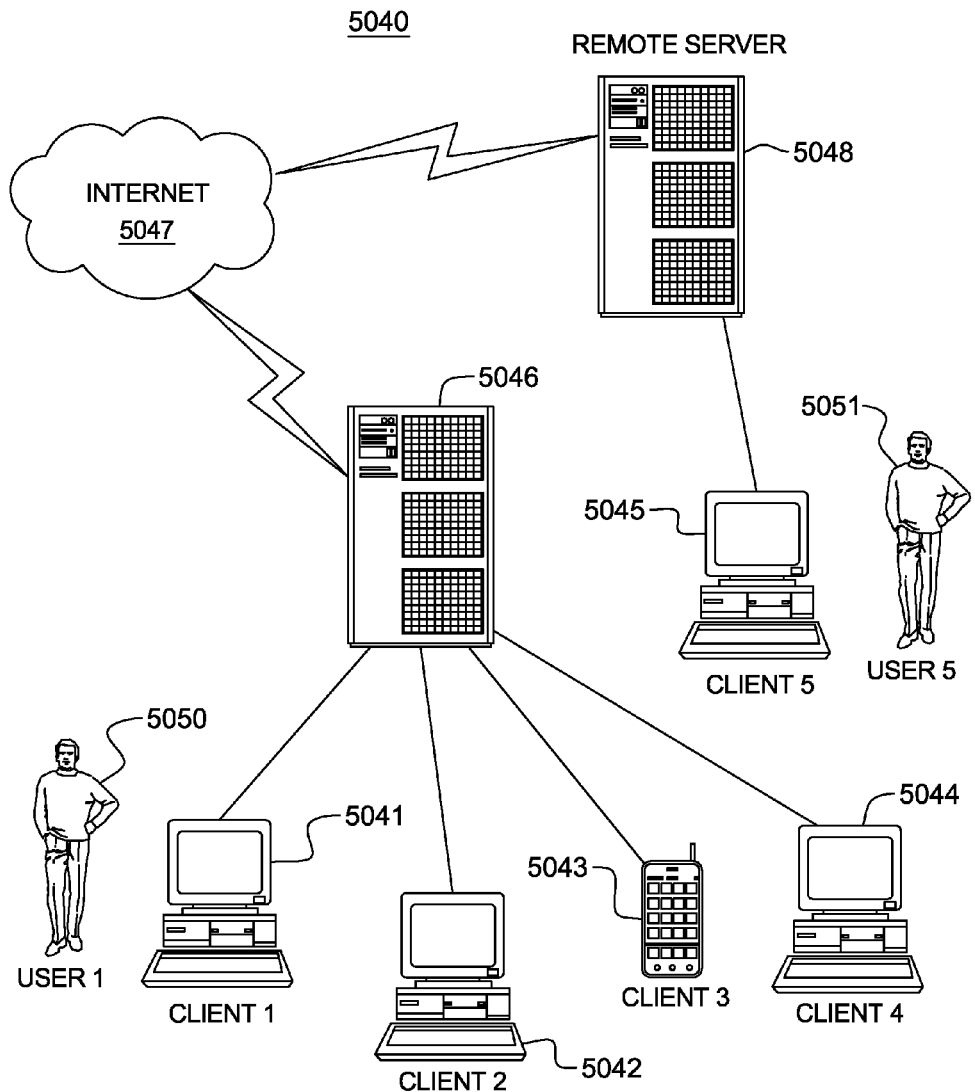
FIG. 14 depicts another example of a computer system comprising a computer network to incorporate and use one or more aspects of the present invention.

FIG. 14 illustrates a data processing network 5040 in which one or more aspects of the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 14, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System Z® server available from International Business Machines Corporation.

Referring concurrently to FIG. 13 and FIG. 14, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 15:
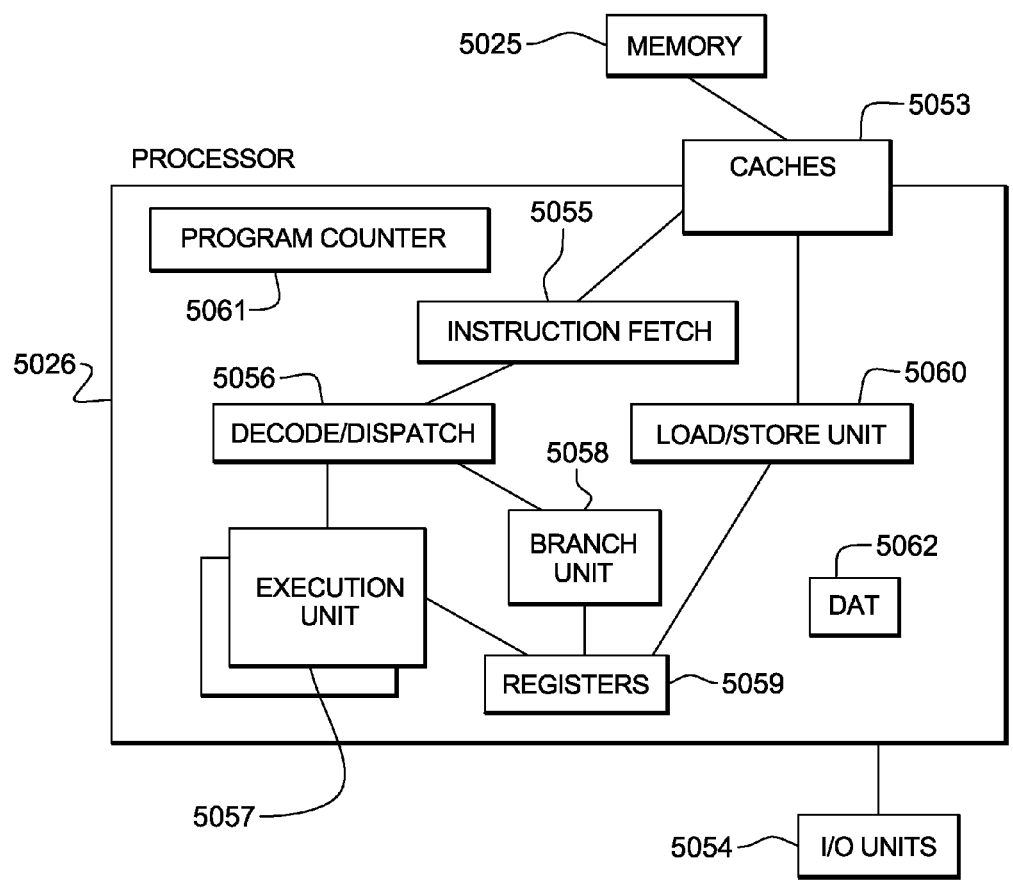
FIG. 15 depicts one embodiment of various elements of a computer system to incorporate and use one or more aspects of the present invention.

Referring to FIG. 15, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 16A:
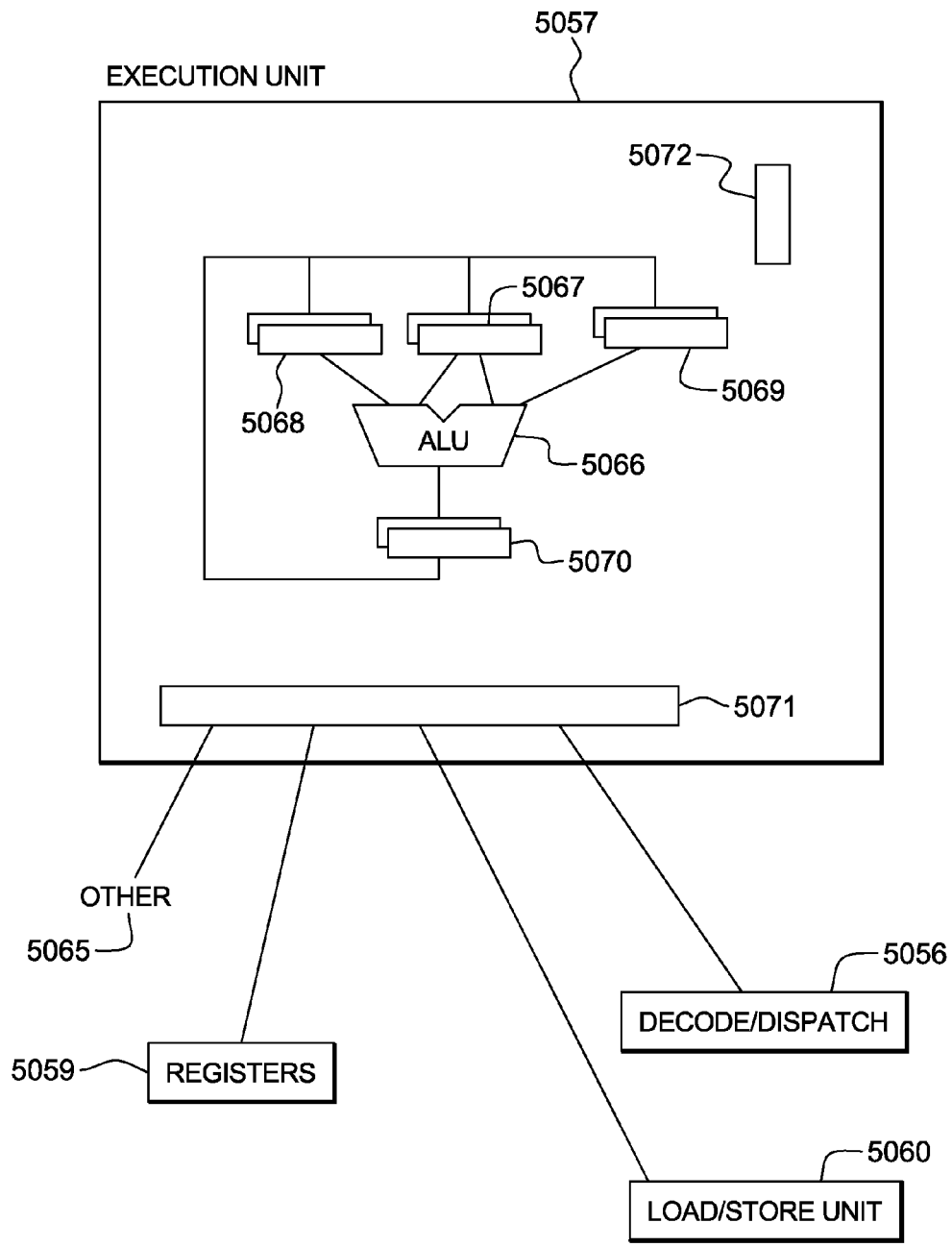
FIG. 16A depicts one embodiment of the execution unit of the computer system of FIG. 15 to incorporate and use one or more aspects of the present invention.

A processor 5026 typically has one or more units 5057, 5058, 5060 for executing the function of the instruction. Referring to FIG. 16A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 16B:
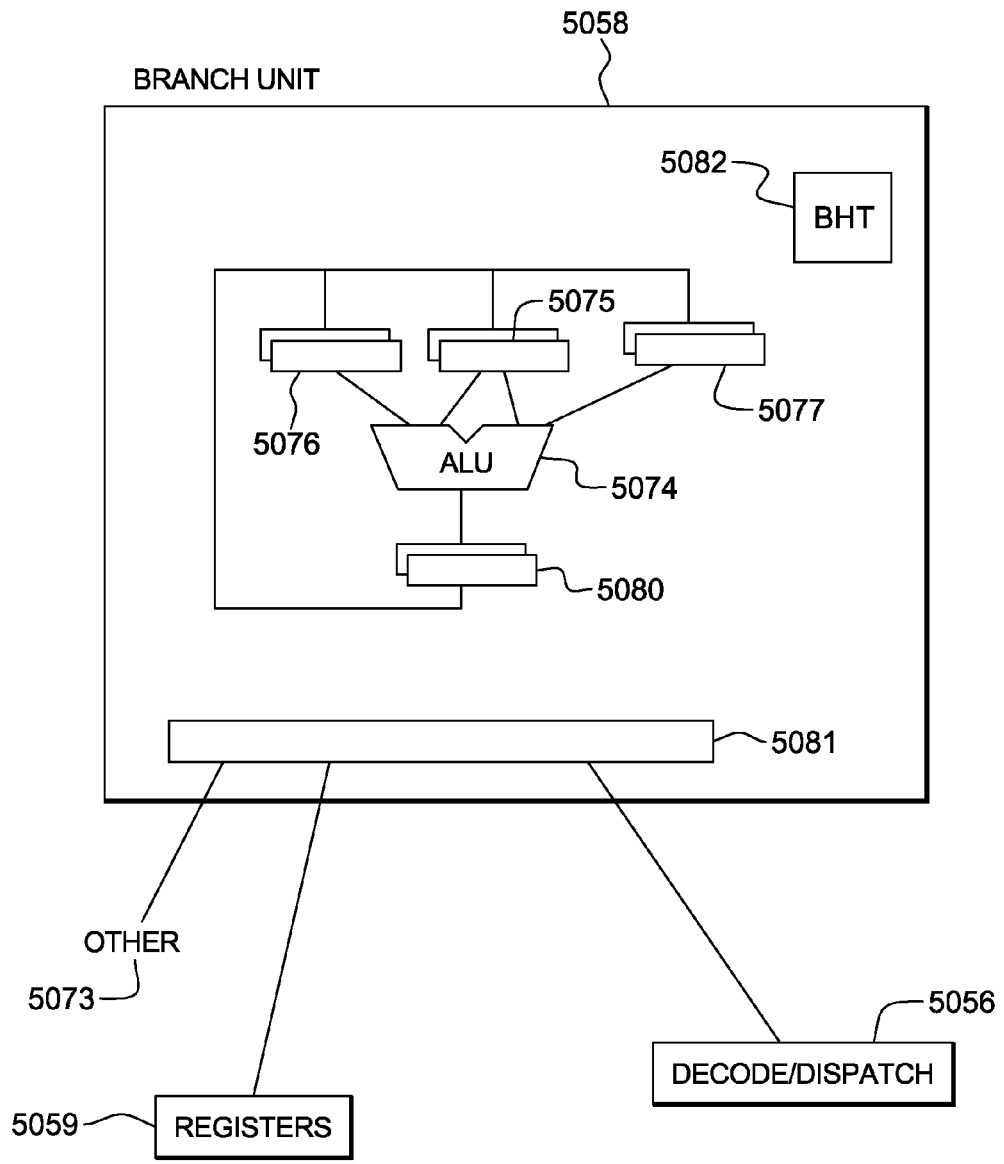
FIG. 16B depicts one embodiment of the branch unit of the computer system of FIG. 15 to incorporate and use one or more aspects of the present invention.

Referring to FIG. 16B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 16C:
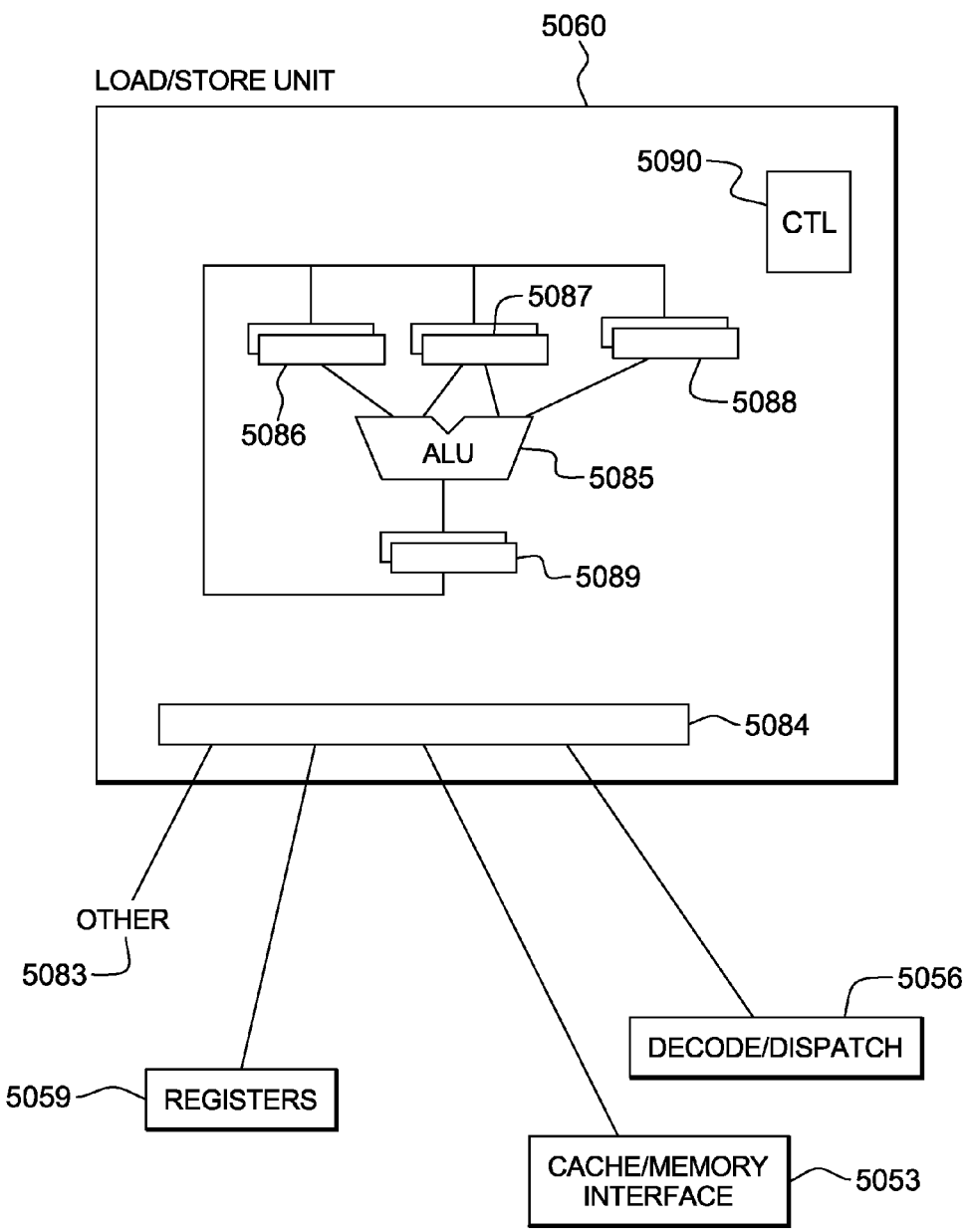
FIG. 16C depicts one embodiment of the load/store unit of the computer system of FIG. 15 to incorporate and use one or more aspects of the present invention.

Referring to FIG. 16C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 15) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, as mentioned herein, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 17:
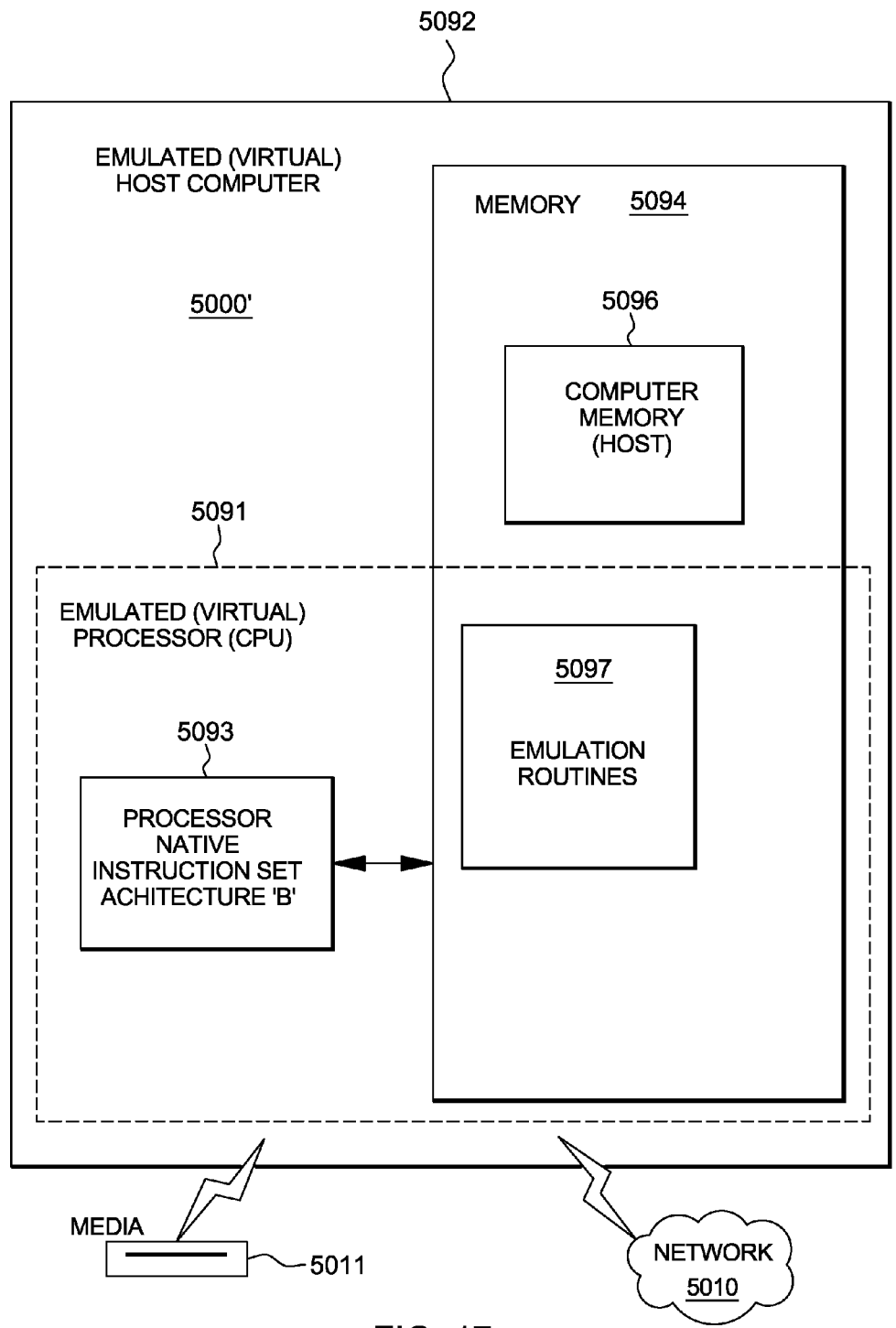
FIG. 17 depicts one embodiment of an emulated host computer system to incorporate and use one or more aspects of the present invention.

In FIG. 17, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating processing in a computing environment, said computer program product comprising:

a non-transitory computer readable storage medium readable by a processing circuit and storing instructions for execution by the processing circuit for performing a method comprising:
obtaining by a program an indication of a warning track facility installed within the computing environment, the warning track facility to provide to the program a warning track grace period to perform a function;
initiating, by the program based on obtaining the indication that the warning track facility is installed, registration of the program for the warning track facility, the registration comprising an unsolicited registration request indicating that the program understands a protocol of the warning track facility and intends to participate in the warning track facility;
receiving by the program a warning track notification indicating the warning track grace period has begun; and
based on the warning track notification, at least initiating by the program the function within the warning track grace period.

2. The computer program product of claim 1, wherein based on the registration of the program, the program is enabled for the warning track facility.

3. The computer program product of claim 1, wherein the warning track notification comprises an interrupt in which shared resources assigned to the program are released subsequent to termination of the warning track grace period.

4. The computer program product of claim 1, wherein the function comprises one of:
completing a dispatchable unit executing on a processor in which the program executes; or
making the dispatchable unit re-dispatchable on another processor of the computing environment.

5. The computer program product of claim 1, wherein the program is a guest program having access to shared resources of the computing environment during a timeslice provided to a guest central processing unit on which the guest program executes, and wherein the warning track grace period is distinguishable from the timeslice.

6. The computer program product of claim 5, wherein the warning track grace period prematurely terminates the timeslice.

7. The computer program product of claim 5, wherein the warning track grace period provides a period in addition to the timeslice to perform the function.

8. The computer program product of claim 1, wherein the method further comprises indicating by the program completion of the function during the warning track grace period.

9. The computer program product of claim 8, wherein the method further comprises receiving by the program, a next time the program executes, an indication that the function completed during the warning track grace period.

10. The computer program product of claim 1, wherein registration is performed via a Diagnose instruction, the Diagnose instruction comprising a register parameter to signal that the program understands a warning track interruption of the warning track facility.

11. The computer program product of claim 1, wherein the grace period is distinguishable from a timeslice provided to a processor on which the program executes, the program having access to shared resources of the computing environment during the timeslice, and wherein the grace period provides a period in addition to the timeslice, wherein any portion of the period used by the program to perform the function is charged against a next timeslice for the program.

12. The computer program product of claim 1, wherein the method further comprises:
obtaining by the program, a next time the program executes, based on determining the program voluntarily exited prior to expiration of the grace period, positive feedback indicating voluntarily exiting prior to expiration of the grace period; and
obtaining by the program, a next time the program executes, based on determining the program was tardy on voluntarily exiting prior to expiration of the grace period, an exception feedback indication indicating tardiness in voluntarily exiting.

13. A computer system for facilitating processing in a computing environment, said computer system comprising:
a memory; and
a processor in communications with the memory, wherein the computer system is configured to perform a method, said method comprising:
obtaining by a program an indication of a warning track facility installed within the computing environment, the warning track facility to provide to the program a warning track grace period to perform a function;
initiating, by the program based on obtaining the indication that the warning track facility is installed, registration of the program for the warning track facility, the registration comprising an unsolicited registration request indicating that the program understands a protocol of the warning track facility and intends to lartici ate in the warning track facility;
receiving by the program a warning track notification indicating the warning track grace period has begun; and
based on the warning track notification, at least initiating by the program the function within the warning track grace period.

14. The computer system of claim 13, wherein the function comprises one of:
completing a dispatchable unit executing on a processor in which the program executes; or
making the dispatchable unit re-dispatchable on another processor of the computing environment.

15. The computer system of claim 13, wherein the program is a guest program having access to shared resources of the computing environment during a timeslice provided to a guest central processing unit on which the guest program executes, and wherein the warning track grace period is distinguishable from the timeslice.

16. The computer system of claim 15, wherein the warning track grace period prematurely terminates the timeslice.

17. The computer system of claim 15, wherein the warning track grace period provides a period in addition to the timeslice to perform the function.

18. The computer system of claim 13, wherein registration is performed via a Diagnose instruction, the Diagnose instruction comprising a register parameter to signal that the program understands a warning track interruption of the warning track facility.

19. The computer system of claim 13, wherein the grace period is distinguishable from a timeslice provided to a processor on which the program executes, the program having access to shared resources of the computing environment during the timeslice, and wherein the grace period provides a period in addition to the timeslice, wherein any portion of the period used by the program to perform the function is charged against a next timeslice for the program.

20. The computer system of claim 13, wherein the method further comprises:

obtaining by the program, a next time the program executes, based on determining the program voluntarily exited prior to expiration of the grace period, positive feedback indicating voluntarily exiting prior to expiration of the grace period; and obtaining by the program, a next time the program executes, based on determining the program was tardy on voluntarily exiting prior to expiration of the grace period, an exception feedback indication indicating tardiness in voluntarily exiting.

* * * * *